United States Patent
Thiergart et al.

(10) Patent No.: US 11,176,952 B2
(45) Date of Patent: Nov. 16, 2021

(54) DIRECTION OF ARRIVAL ESTIMATION USING WATERMARKED AUDIO SIGNALS AND MICROPHONE ARRAYS

(71) Applicant: Fraunhofer-Gesellschaft zur Foerderung der angewandten Forschung e.V., Munich (DE)

(72) Inventors: Oliver Thiergart, Forchheim (DE); Giovanni Del Galdo, Martinroda (DE); Florian Kolbeck, Erlangen (DE); Alexandra Craciun, Erlangen (DE); Stefan Kraegeloh, Erlangen (DE); Juliane Borsum, Erlangen (DE); Tobias Bliem, Erlangen (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 0 days.

(21) Appl. No.: 14/189,058

(22) Filed: Feb. 25, 2014

(65) Prior Publication Data

US 2014/0172435 A1 Jun. 19, 2014

Related U.S. Application Data

(63) Continuation of application No. PCT/EP2012/066964, filed on Aug. 31, 2012.

(30) Foreign Application Priority Data

Aug. 31, 2011 (EP) ..................... 11179591

(51) Int. Cl.
*G10L 19/018* (2013.01)
*G01S 3/80* (2006.01)
(Continued)

(52) U.S. Cl.
CPC .............. *G10L 19/018* (2013.01); *G01S 3/80* (2013.01); *G01S 5/20* (2013.01); *H04R 1/403* (2013.01); *H04R 3/005* (2013.01); *H04R 2430/03* (2013.01)

(58) Field of Classification Search
CPC ... G10L 19/018; G10L 19/0212; G10L 25/51; G10L 25/87; G10L 25/90; G10L 15/22;
(Continued)

(56) References Cited

U.S. PATENT DOCUMENTS 6,526,385 B1 * 2/2003 Kobayashi ............ G10L 19/018
348/423.1
6,535,616 B1 * 3/2003 Hayashi .................. G06T 1/005
375/E7.075
(Continued)

FOREIGN PATENT DOCUMENTS

EP 2362383 A1 8/2011
EP 2362384 A1 8/2011
(Continued)

OTHER PUBLICATIONS

Office Action issued in corresponding Japan Patent Application No. 2014-527673 dated Jul. 28, 2015 (and its English translation).
(Continued)

*Primary Examiner* — Abdelali Serrou
(74) *Attorney, Agent, or Firm* — McClure, Qualey & Rodack, LLP

(57) ABSTRACT

An apparatus for providing direction information based on a reproduced audio signal with an embedded watermark includes a signal processor, which is adapted to process at least two received watermarked audio signals recorded by at least two audio receivers at different spatial positions. The signal processor is adapted to process the received watermarked audio signals to obtain a receiver-specific information for each received watermarked audio signal. The receiver-specific information depends on the embedded watermarks embedded in the received watermarked audio signals. Moreover, the apparatus includes a direction information provider for providing direction information based on the receiver-specific information for each received watermarked audio signal.

16 Claims, 35 Drawing Sheets

(51) Int. Cl.
*H04R 1/40* (2006.01)
*H04R 3/00* (2006.01)
*G01S 5/20* (2006.01)

(58) Field of Classification Search
CPC .............. G10L 19/0204; G10L 19/022; G10L 2015/225; G10L 25/57; H04H 20/31; G11B 20/00086; G11B 20/00884; G01S 5/20; G06F 17/30743; G06F 21/10; G06F 21/16; G06F 2221/0737; G06F 3/011; G06F 21/602; G06F 2221/0733; G06F 17/211; G06F 19/018; G06F 3/1243; G06T 2201/0051; G06T 1/0028; G06T 1/0085; G06T 2201/0061; G06T 1/0021; G06T 2201/0083; G06T 2201/0203; G06T 1/0071; G06T 2201/0065; H04N 19/467; H04N 1/00204; H04N 2201/3235; H04N 2201/327; H04N 1/387; H04N 21/8358; H04N 5/74; G06Q 20/3823; G06Q 20/3827; G06Q 30/06; B41J 11/007; B41J 11/008; B41J 13/08; B41J 29/38; B41J 2/04501; B41J 2/2132
See application file for complete search history.

(56) References Cited

U.S. PATENT DOCUMENTS

| | | | | |
|---|---|---|---|---|
| 6,741,723 | B2* | 5/2004 | Yamakage | G06T 1/005 348/E7.017 |
| 6,892,175 | B1* | 5/2005 | Cheng | G10L 19/018 375/141 |
| 6,983,057 | B1 | 1/2006 | Ho et al. | |
| 7,299,189 | B1* | 11/2007 | Sato | H04H 20/31 704/500 |
| 7,529,941 | B1* | 5/2009 | Johnston | G10L 19/018 283/113 |
| 7,676,336 | B2 | 3/2010 | Herre et al. | |
| 7,760,790 | B2* | 7/2010 | Baum | G10L 19/018 358/3.28 |
| 7,761,304 | B2 | 7/2010 | Faller | |
| 7,957,552 | B2 | 6/2011 | Gustafson et al. | |
| 8,108,681 | B2* | 1/2012 | Venkiteswaran | G10L 19/018 382/100 |
| 8,301,453 | B2* | 10/2012 | Sharma | G06T 1/0064 704/270 |
| 9,117,268 | B2* | 8/2015 | Reed | G06T 1/0028 |
| 9,305,559 | B2* | 4/2016 | Sharma | G10L 19/018 |
| 9,767,820 | B2* | 9/2017 | Des Jardins | G10L 21/0308 |
| 2003/0228030 | A1* | 12/2003 | Wendt | G06T 1/0064 382/100 |
| 2004/0169581 | A1 | 9/2004 | Petrovic et al. | |
| 2004/0204943 | A1* | 10/2004 | Kirovski | G10L 19/018 704/273 |
| 2005/0117775 | A1* | 6/2005 | Wendt | G06T 1/005 382/100 |
| 2005/0123168 | A1* | 6/2005 | Wendt | G06T 1/005 382/100 |
| 2005/0240768 | A1* | 10/2005 | Lemma | G11B 20/00891 713/176 |
| 2006/0156002 | A1 | 7/2006 | Bruekers et al. | |
| 2006/0204031 | A1* | 9/2006 | Kogure | G06T 1/0064 382/100 |
| 2006/0239501 | A1* | 10/2006 | Petrovic | G06T 1/0028 382/100 |
| 2007/0147653 | A1* | 6/2007 | Reed | G06T 1/0028 382/100 |
| 2007/0160261 | A1* | 7/2007 | Robert | G06T 1/0078 382/100 |
| 2007/0165852 | A1* | 7/2007 | Roberts | G06T 1/005 380/201 |
| 2008/0028474 | A1* | 1/2008 | Horne | H04L 9/3247 726/27 |
| 2008/0052516 | A1* | 2/2008 | Tachibana | G06F 16/40 713/176 |
| 2008/0089552 | A1* | 4/2008 | Nakamura | H04N 21/835 382/100 |
| 2008/0247274 | A1 | 10/2008 | Seltzer et al. | |
| 2008/0263359 | A1* | 10/2008 | Radzishevsky | H04N 1/32283 713/176 |
| 2009/0019286 | A1* | 1/2009 | Roberts | G06T 1/005 713/176 |
| 2009/0034704 | A1* | 2/2009 | Ashbrook | H04L 12/1822 379/142.04 |
| 2009/0062008 | A1 | 3/2009 | Karmarkar | |
| 2009/0070119 | A1 | 3/2009 | Yoo et al. | |
| 2009/0141929 | A1* | 6/2009 | Venkiteswaran | G10L 19/018 382/100 |
| 2009/0157204 | A1* | 6/2009 | Smith | G11B 20/00891 700/94 |
| 2010/0034394 | A1 | 2/2010 | Moon et al. | |
| 2010/0286949 | A1* | 11/2010 | Miyamoto | G01S 5/30 702/150 |
| 2010/0316232 | A1* | 12/2010 | Acero | H04M 3/568 381/92 |
| 2011/0021208 | A1* | 1/2011 | Sheynblat | G01S 5/0205 455/456.1 |
| 2011/0158426 | A1 | 6/2011 | Matsuo | |
| 2012/0076435 | A1* | 3/2012 | Sharma | G06T 1/0064 382/277 |
| 2012/0214515 | A1* | 8/2012 | Davis | G10L 19/018 455/456.3 |
| 2012/0214544 | A1* | 8/2012 | Shivappa | G06Q 30/0261 455/556.1 |
| 2012/0243727 | A1* | 9/2012 | Hwang | G06T 1/0085 382/100 |
| 2014/0278447 | A1* | 9/2014 | Unoki | G10L 19/018 704/500 |
| 2014/0343703 | A1* | 11/2014 | Topchy | G10L 19/018 700/94 |

FOREIGN PATENT DOCUMENTS

| | | |
|---|---|---|
| EP | 2362385 A1 | 8/2011 |
| EP | 2362386 A1 | 8/2011 |
| EP | 2362387 A1 | 8/2011 |
| JP | 2008-064568 A | 3/2008 |
| JP | 2009-080309 A | 4/2009 |
| JP | 2010-156741 A | 7/2010 |
| JP | 2010-169443 A | 8/2010 |
| JP | 2011-139378 | 7/2011 |
| KR | 1020070086849 A | 6/2007 |
| KR | 1020080094851 A | 10/2008 |
| KR | 20110042305 A | 4/2011 |
| RU | 2376708 C2 | 12/2009 |
| TW | 200621026 A | 6/2006 |
| TW | I335522 B | 1/2011 |
| WO | 2005109702 A1 | 11/2005 |
| WO | 2009/077930 A1 | 6/2009 |

OTHER PUBLICATIONS

L. Boney et al.: "Digital watermarks for audio signals"; Proceedings of the International Confernece on MultimediaComputing and Systems; Jun. 17, 1996; pp. 473-480.

Pedro Cano et al.: "A Review of Audio Fingerprinting"; The Journal of VLSI Signal Processing; Kluwer Academic Publishers; vol. 41; No. 3; Nov. 1, 2005; pp. 271-284.

Ryosuke Kaneto et al.: "Real-Time User Position Estimation in Indoor Environments Using Digital Watermarking for Audio Signals"; 20th International Conferene on Pattern Recognition (ICPR); IEEE; Aug. 23, 2010 pp. 97-100.

Jukka Ahonen et al.: "Planar microphone array processing for the analysis and reproduction of spatial audio using directional audio coding"; Audio Engineering Society Convention; vo. 124; No. 5; 2008.

Giovanni Del Galdo et al.: "Acoustic measurement systems for 3-D loudspeaker set-ups"; Audio Engineering Society Conference: Spatial Audio: Sense the Sound of Space; vol. 10; 2010.

(56) References Cited

OTHER PUBLICATIONS

Ryuki Tachibana et al.: "An audio watermarking method using a two-dimensional pseudo-random array"; Signal Process; vol. 82; Oct. 2002; pp. 1455-1469.
Office Action dated Apr. 21, 2015 in corresponding Korean patent application No. 10-2014-7008157 and its English translation.
Office Action dated May 5, 2015 in corresponding China patent application No. 201280052151.0 and its English translation.
Taiwan Office Action dated May 7, 2014.
English translation of Taiwan Office Action dated May 7, 2014.
English translation of abstract of TW I335522 B (published Jan. 1, 2011).
English translation of abstract of TW 200621026 A (published Jun. 16, 2006).
Decision to Grant a Patent dated Jan. 12, 2017, in application No. KR. 10-2014-7008157.
English language translation of Decision dated Jan. 12, 2017.
Office Action issued in corresponding India Patent Application No. 397/KOLNP/2014 dated May 30, 2018.

\* cited by examiner

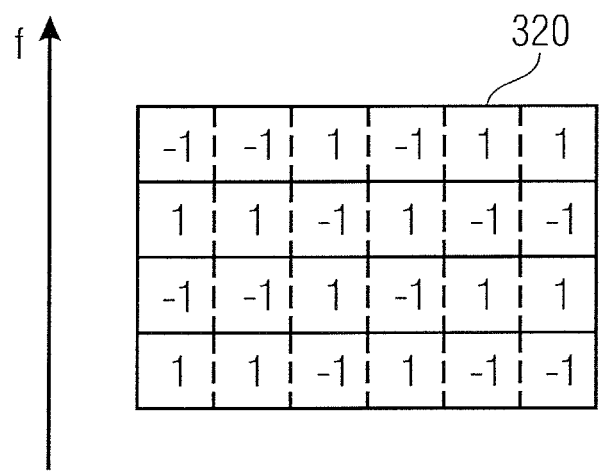
FIG 3A
FIG 3B
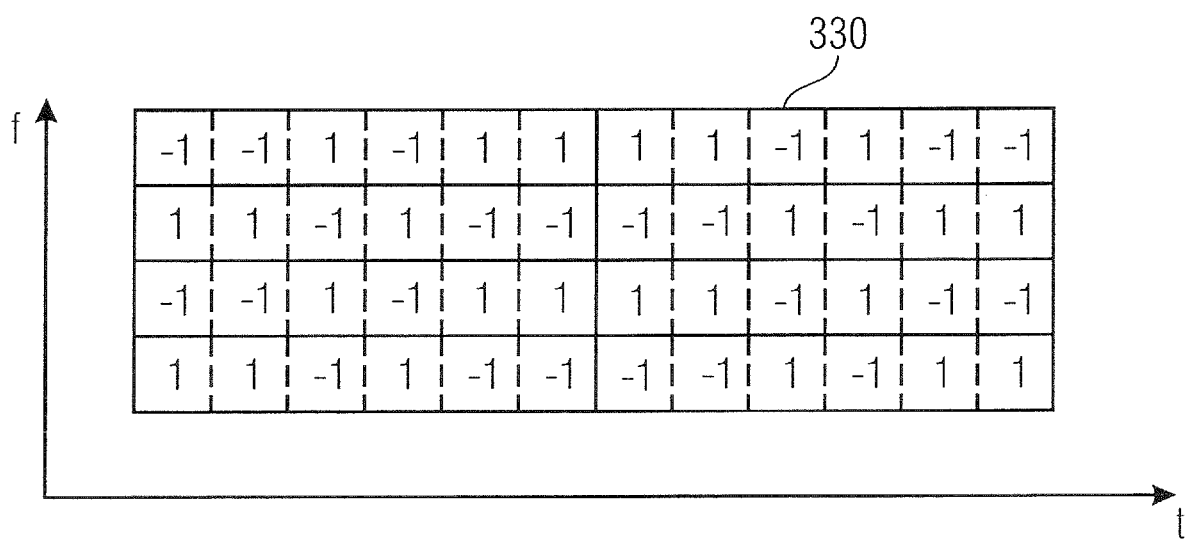
FIG 3C

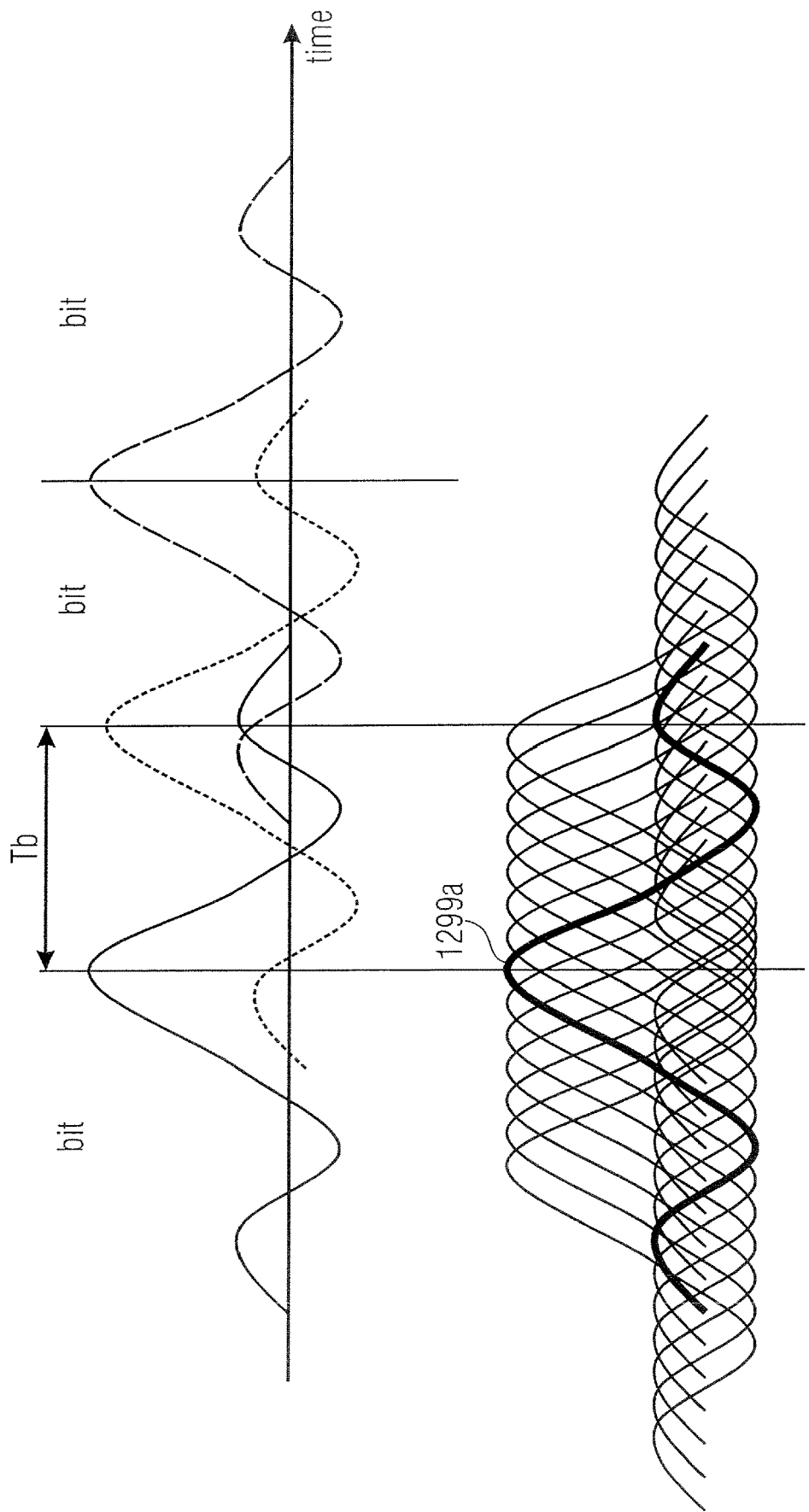

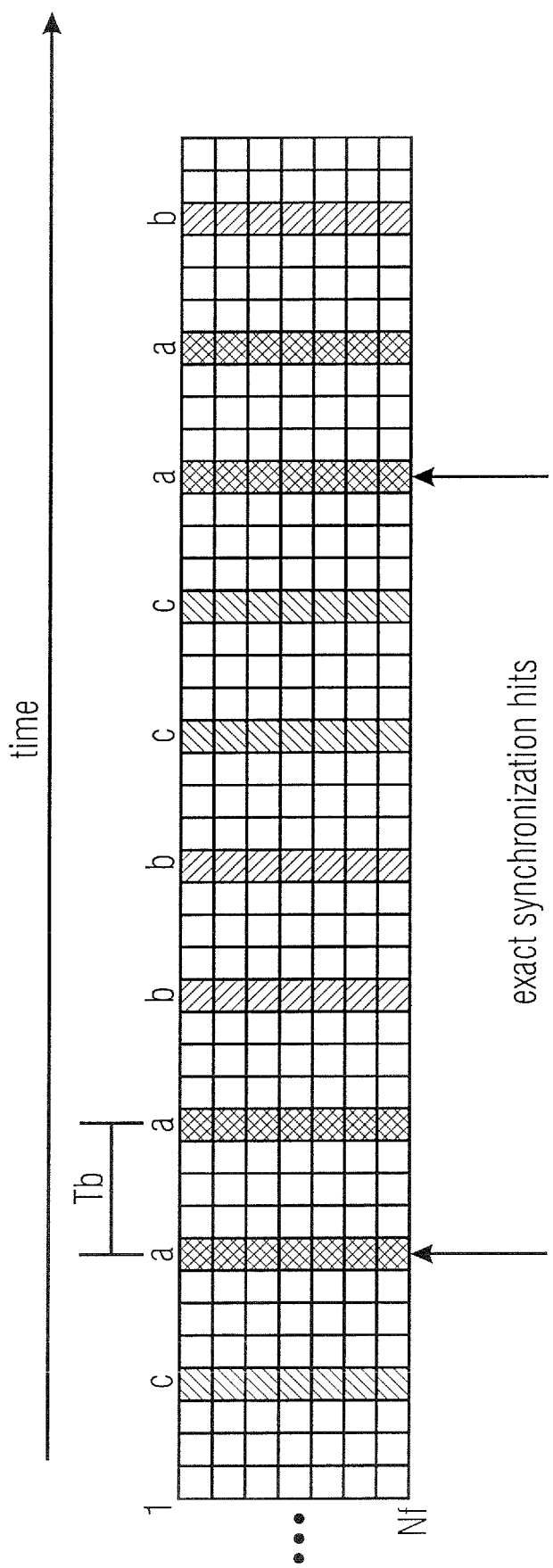

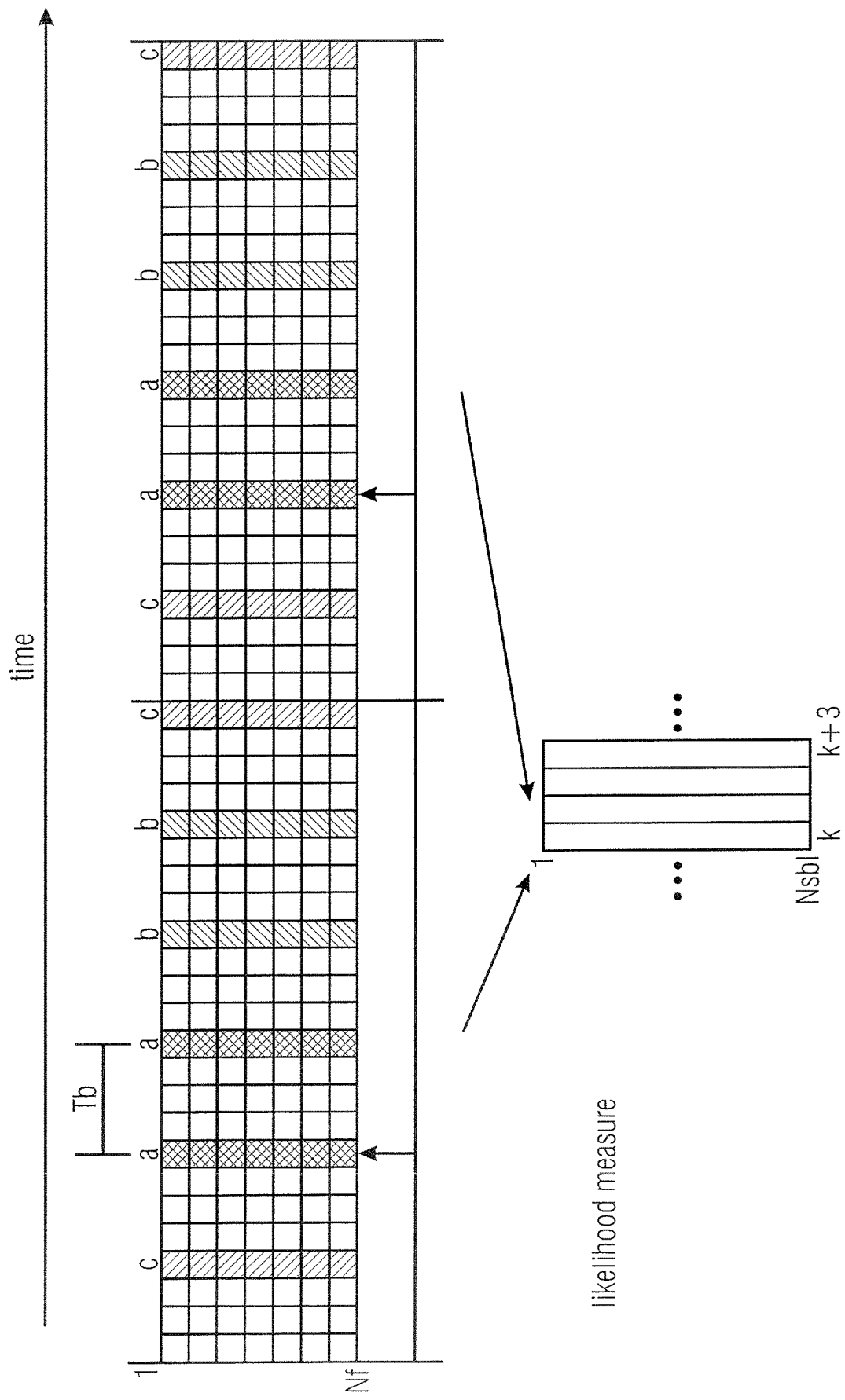

FIG 15C

DIRECTION OF ARRIVAL ESTIMATION USING WATERMARKED AUDIO SIGNALS AND MICROPHONE ARRAYS

CROSS-REFERENCE TO RELATED APPLICATIONS

This application is a continuation of copending International Application No. PCT/EP2012/066964, filed Aug. 31, 2012, which is incorporated herein by reference in its entirety, and additionally claims priority from European Application No. 11179591.0-2220, filed Aug. 31, 2011, which is also incorporated herein by reference in its entirety.

The present invention relates to determining the direction of arrival of an acoustic source such as a loudspeaker, and an apparatus and method for spatial position estimating.

BACKGROUND OF THE INVENTION

Retrieving geometric information of a sound scene, such as localization estimation and estimation of direction of arrival of incoming signals, is becoming more and more important, as this information is valuable in a variety of applications, such as acoustic echo control, scene analysis, beamforming, and signal processing for distributed acoustic sensors.

For example, there are methods which analyze a recorded audio signal, in which no watermark signal is embedded, if a single loudspeaker is reproducing an audio item and a microphone array is available to do the recording. If there is no other sound source present, for instance a human talker or another interferer, it is possible to estimate the direction of arrival, e.g., via Directional Audio Coding. Reference is made to the document Jukka Ahonen, Giovanni Del Galdo, Markus Kallinger, Fabian Küch, Ville Pulkki, and Richard Schultz-Amling, "Planar microphone array processing for the analysis and reproduction of spatial audio using directional audio coding", in Audio Engineering Society Convention 124, 5, 2008. As soon as another source is emitting sound at the same time, whose direction of arrival is not desired, the determination of the correct incidence angle is hindered. One will obtain two different estimates of the direction of arrival if the present signals originate from different spatial positions. In this case, further information about the favored sound signal is useful.

In a scenario of a reproduction system with more than just one loudspeaker, if the reproduced signals are different, it is possible to estimate the direction of arrival using the previously explained approaches. However, if similar audio items are played back, i.e. in a stereo setup, a well-known phenomenon arises, namely the phantom image source. This means that the sound is perceived as if it is was played by a virtual source located between the loudspeakers. In this case, the estimation of the incidence angles fails.

For the special application involving the calibration of a reproduction system, there exist other well-known methods, e.g., playing MLS or sweep signals, which are used for determining the incidence angle of the played back sound. Reference is made to Giovanni Del Galdo, Matthias Lang, Jose Angel Pineda Pardo, Andreas Silzle, and Oliver Thiergart, "Acoustic measurement system for 3-D loudspeaker set-ups", in Audio Engineering Society Conference: Spatial Audio: Sense the Sound of Space, 10 2010. However, these signals are audible and often annoying. Furthermore, the calibration needs to be performed before the reproduction system can be used. Therefore, the use of watermarked audio signals is advantageous having in mind that the calibration can be performed during system operation.

An often used technique for determining the direction or the position of a sensor employs radio frequency signals and various sensors. Methods based on this technology provide good estimates, but they are not applicable in areas where radio frequency signals are prohibited or difficult to use. Furthermore, in such scenarios, radio frequency sensors would have to be installed.

Another method that also makes use of watermark signals is presented in Ryuki Tachibana, Shuichi Shimizu, Seiji Kobayashi, and Taiga Nakamura, "An audio watermarking method using a two-dimensional pseudo-random array", Signal Process., vol. 82, pp. 1455-1469, Oct. 2002. Here, a recording position is estimated by using only one microphone and measuring the time delay of arrival of several emitted watermarked audio signals. In this scenario, there is no direction information available and the system is restricted to the usage of a minimum number of loudspeakers.

As has been described above, conventional technology exhibits several problems. According to some conventional-technology methods, a phantom source may be localized which does not correspond to the desired loudspeaker. Other conventional-technology methods exhibit the problem that they would localize other sources in the room or that they need special measurement signals which cannot be reproduced in a live situation where the loudspeakers are actually used.

SUMMARY

According to an embodiment, an apparatus for providing direction information based on a reproduced audio signal with an embedded watermark may have: a signal processor being adapted to process at least two recorded watermarked audio signals recorded by at least two audio receivers at different spatial positions, wherein the audio receivers are adapted to record sound waves of the reproduced audio signal to acquire the recorded watermarked audio signals, each recorded watermarked audio signal having the embedded watermark, wherein the signal processor is adapted to process the recorded watermarked audio signals to acquire phase information as receiver-specific information for each recorded watermarked audio signal, the receiver-specific information depending on the embedded watermarks embedded in the recorded watermarked audio signals, and a direction information provider for providing direction information based on the receiver-specific information for each recorded watermarked audio signal.

According to another embodiment, an apparatus for spatial position estimating may have: an apparatus for providing direction information according to claim 1, and a position estimator for estimating a position of the apparatus for spatial position estimating, wherein the position estimator is adapted to estimate the position of the apparatus for spatial position estimating based on the direction information provided by the apparatus for providing direction information.

According to another embodiment, a method for providing direction information may have the steps of: receiving watermarked audio signals, each recorded watermarked audio signal having an embedded watermark, processing at least two recorded watermarked audio signals recorded by at least two audio receivers at different spatial positions to determine phase information as receiver-specific information for each recorded watermarked audio signal, wherein the receiver-specific information depends on the embedded watermarks embedded in the recorded watermarked audio signals, and providing direction information based on the receiver-specific information for each recorded watermarked audio signal.

Another embodiment may have a computer program for performing the method of claim 14 or 15, when the computer program is executed by a computer or processor.

An embodiment describes a method used for determining the direction information, e.g., direction of arrival (DoA) of an audio signal reproduced by a loudspeaker. The signal acts as a carrier for an inaudible watermark signal which was generated in time-frequency domain. It gets recorded by a microphone array comprising at least two microphones.

Following this, the recordings are further processed with the aim of detecting the embedded watermark signal. Once the watermark is recovered, it can be used to estimate the direction of the sound origin relative to an array's orientation. Depending on the application, this concept can be further adapted and applied to a setup comprising an arbitrary number of loudspeakers.

In an embodiment, the signal processor comprises an analysis module for transforming the received watermarked audio signals from a time domain into a time-frequency domain to obtain a time-frequency domain transmission signal comprising a plurality of subband signals. In an embodiment, the signal processor may be adapted to determine a complex number as receiver-specific information. For example, the complex number may indicate the value of a complex coefficient or an averaged complex coefficient of a watermarked audio signal recorded by one of the audio receivers. In a further embodiment, the signal processor may be adapted to determine phase information as receiver-specific information. For example, the phase information may be a phase value or an averaged phase value of a watermarked audio signal recorded by one of the audio receivers. In a further embodiment, the signal processor may be adapted to determine an amplitude value or an averaged amplitude value of a watermarked audio signal recorded by one of the audio receivers as receiver-specific information.

According to an embodiment, the signal processor is adapted to determine an averaged phase value as phase information based on a determined averaged complex coefficient. The signal processor may be adapted to generate the averaged complex coefficient by determining an averaged periodical block comprising processed complex coefficients of a subband signal.

In an embodiment, the signal processor is adapted to determine averaged complex coefficients by combining at least two processed complex coefficients of a subband signal, wherein the processed complex coefficients have equal phase values or phase values that differ by no more than 0.5 in radian measure. The signal processor may furthermore be adapted to generate processed complex coefficients by changing the phase value of a complex coefficient by a predetermined number, e.g. by 180°, when antipodal BPSK is used as modulation scheme, or by an appropriate phase value depending on the modulation scheme used and on the known embedded sequence.

According to an embodiment, the signal processor is adapted to determine a synchronization hit position that indicates the position of a complex coefficient encoding a first bit of a watermark signature.

The direction information provider may be adapted to employ phase values for determining and providing direction information. Moreover, the direction information provider may be adapted to provide a direction of arrival vector as direction information.

Furthermore, a method for providing direction information is provided. The method comprises the steps of receiving watermarked audio signals, each received watermarked audio signal comprising an embedded watermark, processing at least two received watermarked audio signals recorded by at least two audio receivers at different spatial positions to determine a receiver-specific information for each received watermarked audio signal, wherein the receiver-specific information depends on the embedded watermarks embedded in the received watermarked audio signals, and providing direction information based on the receiver-specific information for each received watermarked audio signal.

Moreover, an apparatus for spatial position estimating is provided. The apparatus comprises an apparatus for providing direction information according an embodiment, and a position estimator for estimating a position of the apparatus for spatial position estimating, wherein the position estimator is adapted to estimate the position of the apparatus for spatial position estimating based on the direction information provided by the apparatus for providing direction information.

The concept for spatial position estimation is based on determining the spatial recording position of the microphone array provided that a sufficient number of loudspeakers is available and their spatial positions are known. For example, three loudspeakers may be employed to determine the position of a microphone array in a common plane. It should be mentioned that the proposed concept is not restricted to the determination of the azimuth. In addition to this, the elevation can be estimated depending on the used direction estimation method.

Furthermore, a method for spatial position estimating is provided. The method comprises receiving watermarked audio signals by employing an array of at least two audio receivers, each received watermarked audio signal comprising an embedded watermark; processing at least two received watermarked audio signals recorded by at least two audio receivers at different spatial positions to determine a receiver-specific information for each received watermarked audio signal, wherein the receiver-specific information depends on the embedded watermarks embedded in the received watermarked audio signals; providing direction information based on the receiver-specific information for each received watermarked audio signal; and estimating a position of the array of at least two audio receivers, wherein the position is determined based on the direction information.

Examples of possible applications are for example toys which could react to the playback of a certain audio signal, e.g., an action doll could move its head towards a TV when a certain TV series is played.

A further application example is reproduction system calibration: the present invention could be used to automatically calibrate a reproduction system, e.g. a setup for teleconferencing or a home theater system, while the conference is already proceeding or an audio item is played. In this case, no previous calibration is necessary.

Furthermore the channels of an audio signal could be steered to either turn up or turn down the sound of certain loudspeakers at certain positions depending on the provided direction information. Moreover, a user could be instructed by a system how to optimally place loudspeakers of a sound system depending of the provided direction information.

A further application example is the above-described apparatus for spatial position estimating.

BRIEF DESCRIPTION OF THE DRAWINGS

Embodiments of the present invention will be detailed subsequently referring to the appended drawings, in which:

FIG. 3a-3c illustrates a watermark that is frequency-spread and time-spread, FIG. 12a shows a graphical representation of the problem of finding the temporal alignment of a watermark, FIG. 12c shows a graphical representation of data used for synchronization, FIG. 12d shows a graphical representation of a concept of identifying a synchronization hit, FIG. 15c illustrates sample integration at different stages.

DETAILED DESCRIPTION OF THE INVENTION

1. Apparatus for Providing Direction Information According to FIG. 1

Figure 1:
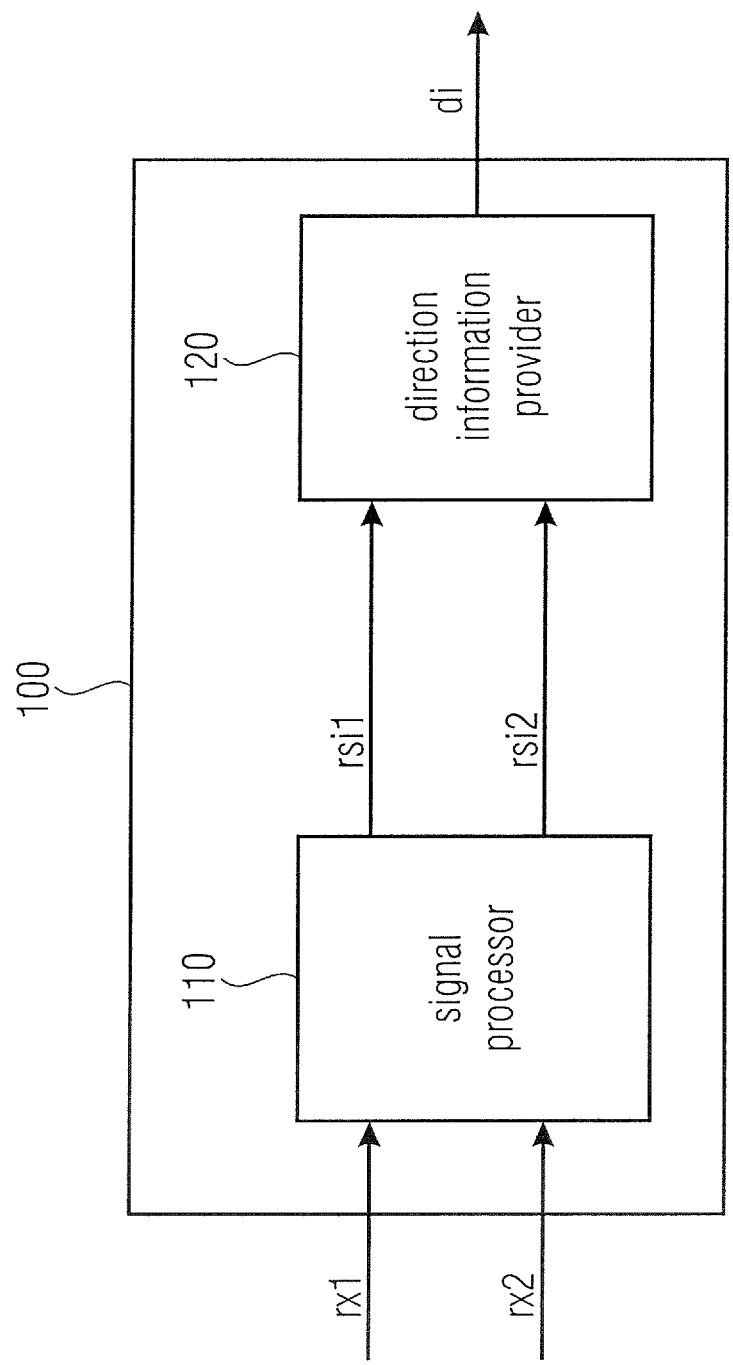
FIG. 1 shows a schematic block diagram of an apparatus for providing direction information according to an embodiment.

FIG. 1 illustrates an apparatus 100 for providing direction information based on a reproduced audio signal with an embedded watermark according to an embodiment. The apparatus 100 comprises a signal processor 110. The signal processor 110 is adapted to process at least two received watermarked audio signals rx1, rx2 recorded by at least two audio receivers at different spatial positions. The at least two audio receivers are adapted to record sound waves of the reproduced audio signal to obtain the at least two received watermarked audio signals. Each received watermarked audio signal rx1, rx2 comprises the embedded watermark. Moreover, the signal processor 110 is adapted to process the received watermarked audio signals to obtain a receiver-specific information rsi1, rsi2 for each received audio signal rx1, rx2. The receiver-specific information rsi1, rsi2 depends on the watermarks embedded in the received watermarked audio signals rx1, rx2. Furthermore, the apparatus 100 for providing direction information comprises a direction information provider 120. The direction information provider is adapted to provide direction information di based on the receiver-specific information rsi1, rsi2 for each received audio signal rx1, rx2.

Figure 2:
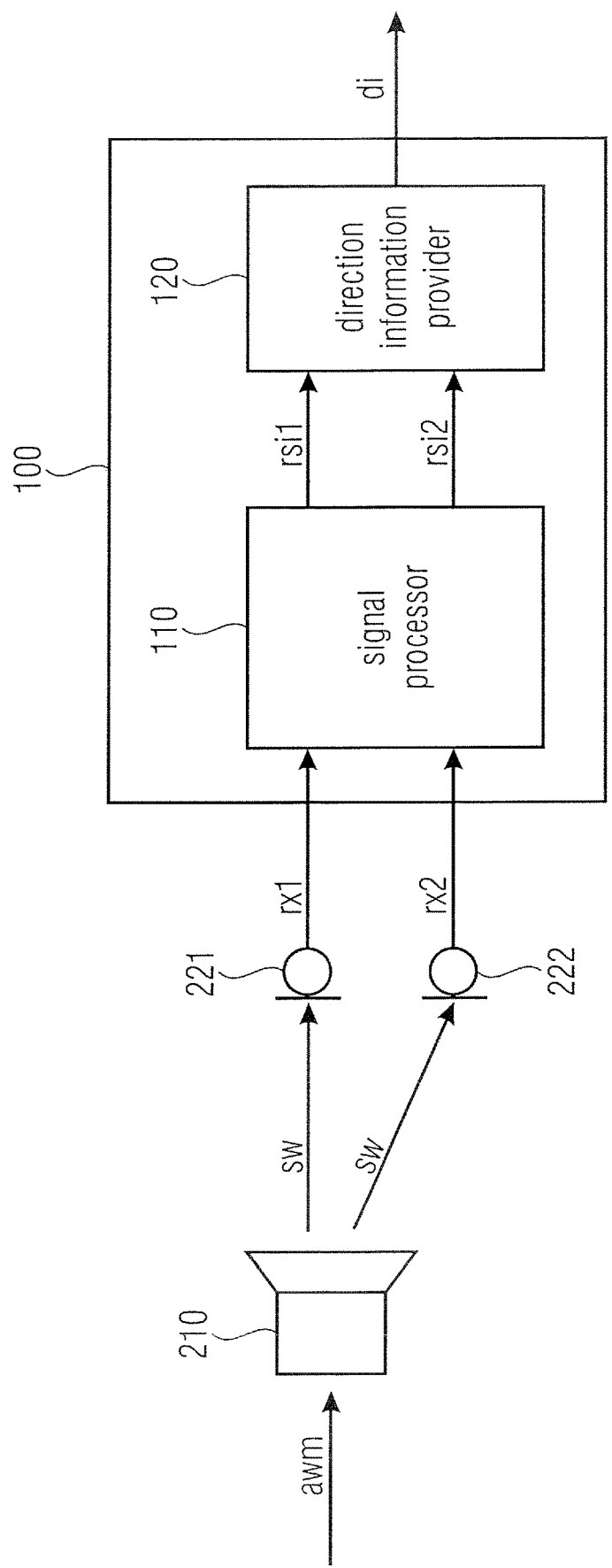
FIG. 2 illustrates an apparatus for providing direction information in an application scenario according to an embodiment.
Figure 4:
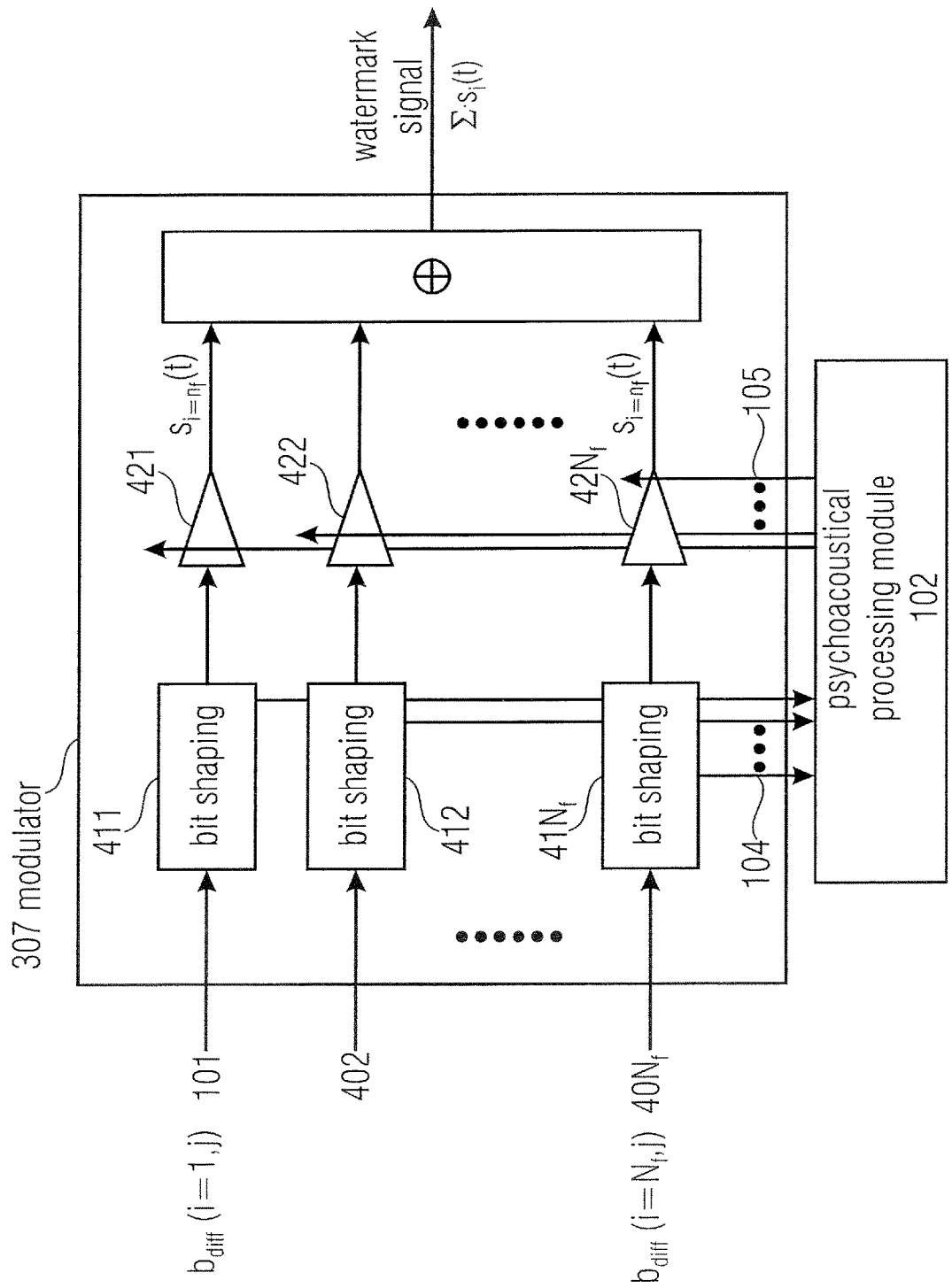
FIG. 4 shows a modulator for generating a watermark signal.

2. Application Scenario According to FIG. 2:

FIG. 2 illustrates a scenario, wherein an apparatus 100 for providing direction information receives two watermarked audio signals rx1, rx2 from two audio receivers 221, 222. In FIG. 252, an audio signal awm comprising a watermark is reproduced by a loudspeaker 210 as sound waves sw. The sound waves sw are recorded by at least two audio receivers 221, 222, e.g. two microphones to obtain at least two received audio signals rx1, rx2. Each received audio signal rx1, rx2 comprises the embedded watermark.

The received watermarked audio signals rx1, rx2 are then input into the signal processor 110 of the apparatus 100 for providing direction information. The signal processor 110 is adapted to process the received watermarked audio signals rx1, rx2 to obtain a receiver-specific information rsi1, rsi2 for each received watermarked audio signal rx1, rx2. The receiver-specific information may be phase information depending on the watermark comprised in the received watermarked audio signals. Moreover, the phase information depends on the spatial position of the audio receivers. For example, a sound wave of a reproduced audio signal comprising the watermark may arrive slightly earlier at a first audio receiver 221 than at a second audio receiver 222.

Therefore, the watermark in the first received signal rx1 is received slightly earlier than in the second received signal rx2. In general, both received signals rx1, rx2 are quite similar. However, as both signals are slightly shifted in time with respect to each other, transforming both received signals rx1, rx2 from a time domain into a time-frequency domain in general results in different phase values of both frequency-domain signals regarding the same frequency subband and time index.

The signal processor 110 feeds the receiver-specific information rsi1, rsi2 into the direction information provider 120. The direction information provider 120 is adapted to provide direction information di based on the receiver-specific information rsi1, rsi2 for each received audio signal rx1, rx2. For example, the direction information di may be provided based on phase information. A first phase value of the first received signal rx1 and a second phase value of the second received signal rx2 may be processed e.g. by calculating a phase difference. Based on the calculated phase difference, the direction information provider 120 may determine the direction information di. For example, possible directions where the sound waves of the reproduced audio signal might originate from, may be determined.

3. Watermark Generation:

In the following, to provide background information about watermarks, watermark generation in an encoder is explained with reference to the drawings depicted in FIGS. 3a-5. Watermarking techniques generating the watermark in time-frequency domain are presented in European Patent Applications, Application Numbers 10154953.3, 10154960.8, 10154964.0, 10154948.3, 10154956.6 and 10154951.7 which are herein incorporated by reference.

Basically a watermark is an encoded bit signature that is hidden in another signal, for example an audio signal. The bit signature may be encoded employing a plurality of frequency bands (subbands).

FIG. 3a-3c illustrate the binary values of a watermark signature that are to be encoded in different frequency bands. Although a watermark may be used to transmit information, in the following, we will focus on the aspect of using a watermark to transmit a watermark signature.

In general, a watermark signature may be an arbitrary sequence of bits, e.g. a bit sequence: [1, 1, −1, 1, −1, −1]. FIG. 3a illustrates a corresponding watermark signature 310.

The watermark bit sequence is spread in frequency by using a spreading sequence. For example, to spread the watermark signature to m frequency bands, a spreading vector comprising m values may be employed. In the simplest case, a spreading vector only comprising 1s, e.g. [1, 1, 1] may be employed which results in that the watermark signature is copied for each respective frequency band. In a more sophisticated embodiment, the spreading vector may also comprise −1s, e.g. [1, −1, 1], which results in that the watermark signature is inverted before being copied for being encoded in the respective frequency band for the respective −1 bits. FIG. 3b illustrates the above watermark signature that is frequency-spread by employing a spreading vector [1, −1, 1, −1] to obtain a frequency-spreaded watermark 320.

The frequency-spreaded watermark may also be spread in a time-domain by employing a spreading vector. For example, by employing a vector [1, −1] for time spreading, each one of the frequency-spread watermark signatures may at first be encoded in its original form, and may then be inverted for being encoded. FIG. 3c illustrates the frequency-spreaded and time-spreaded watermark signature 330 wherein time spreading has been conducted by employing a spreading vector [1, −1].

After being spread in frequency and possibly in time, the watermark signature may be repeatedly encoded.

The different bit sequences may be differentially encoded. A differential encoder may perform the differential encoding of the bits. This step gives the system additional robustness against phase shifts due to movement or local oscillator mismatches. If b(i; j) is the bit for the i-th frequency band and j-th time block, the output bit $b_{diff}$(i; j) is $$b_{diff}(i,j)=b_{diff}(i,j-1) \cdot b(i,j).$$

At the beginning of the stream, that is for j=0, $b_{diff}$(i,j−1) is set to 1.

A modulator 307 carries out the actual modulation, i.e., the generation of the watermark signal waveform depending on the binary information given at its input. A more detailed schematics of a corresponding modulator is given in FIG. 4. $N_f$ parallel inputs, 401 to 40$N_f$ contain the bit streams for the different subbands. Each bit of each subband stream is processed by a bit shaping block (411 to 41$N_f$). The output of the bit shaping blocks are waveforms in time domain. The waveform generated for the j-th time block and i-th subband, denoted by $s_{i,j}$(t), on the basis of the input bit $b_{diff}$(i, j) is computed as follows:

$$s_{i,j}(t)=b_{diff}(i,j)\gamma(i,j) \cdot g_i(t-j \cdot T_b),$$

where γ(i; j) is a weighting factor provided by a psychoacoustical processing unit, $T_b$ is the bit time interval, and $g_i$(t) is the bit forming function for the i-th subband. The bit forming function is obtained from a baseband function $g_i^T$(t) modulated in frequency with a cosine $$g_i(t)=g_i^T(t) \cdot \cos(2\pi f_i t)$$

where $f_i$ is the center frequency of the i-th subband and the superscript T stands for transmitter. The baseband functions can be different for each subband. If chosen identical, a more efficient implementation at the decoder is possible.

The embedding process described above refers to an antipodal BPSK modulation scheme, i.e., where the encoded information bit simply changes the sign of the bit forming function. Alternatively, two or more bits can be grouped and a higher order modulation constellation (such as QAM or M-PSK) can be used. Differential encoding can still be applied, as commonly done, for instance, in differentially-encoded QPSK.

The bit shaping for each bit is repeated in an iterative process controlled by a psychoacoustical processing module 102. Iterations may be useful to fine tune the weights γ(i, j) to assign as much energy as possible to the watermark while keeping it inaudible.

The complete waveform at the output of the i-th bit shaping filter 41i is $$s_i(t) = \sum_j s_{i,j}(t).$$

Figure 9A:
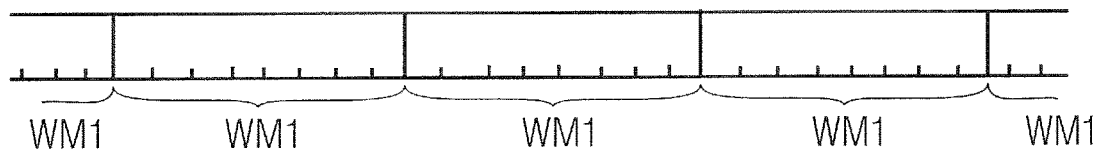
FIG. 9a-9d depict watermark signatures, synchronization blocks, periodical blocks and an averaged synchronization block according to an embodiment.

The bit forming baseband function $g_i^T$(t) is normally non zero for a time interval much larger than $T_b$, although the main energy is concentrated within the bit interval. An example can be seen in FIG. 9a where the same bit forming baseband function is plotted for two adjacent bits. In FIG. 9a, we have $T_b$=40 ms. The choice of $T_b$ as well as the shape of the function affect the system considerably. In fact, longer symbols provide narrower frequency responses. This is particularly beneficial in reverberant environments.

In fact, in such scenarios the watermarked signal reaches the microphone via several propagation paths, each characterized by a different propagation time. The resulting channel exhibits strong frequency selectivity. Interpreted in time domain, longer symbols are beneficial as echoes with a delay comparable to the bit interval yield constructive interference, meaning that they increase the received signal energy. Notwithstanding, longer symbols bring also a few drawbacks; larger overlaps might lead to intersymbol interference (ISI) and are for sure more difficult to hide in the audio signal, so that the psychoacoustical processing module would allow less energy than for shorter symbols.

The watermark signal is obtained by summing all outputs of the bit shaping filters $$\sum_i s_i(t).$$

Figure 5:
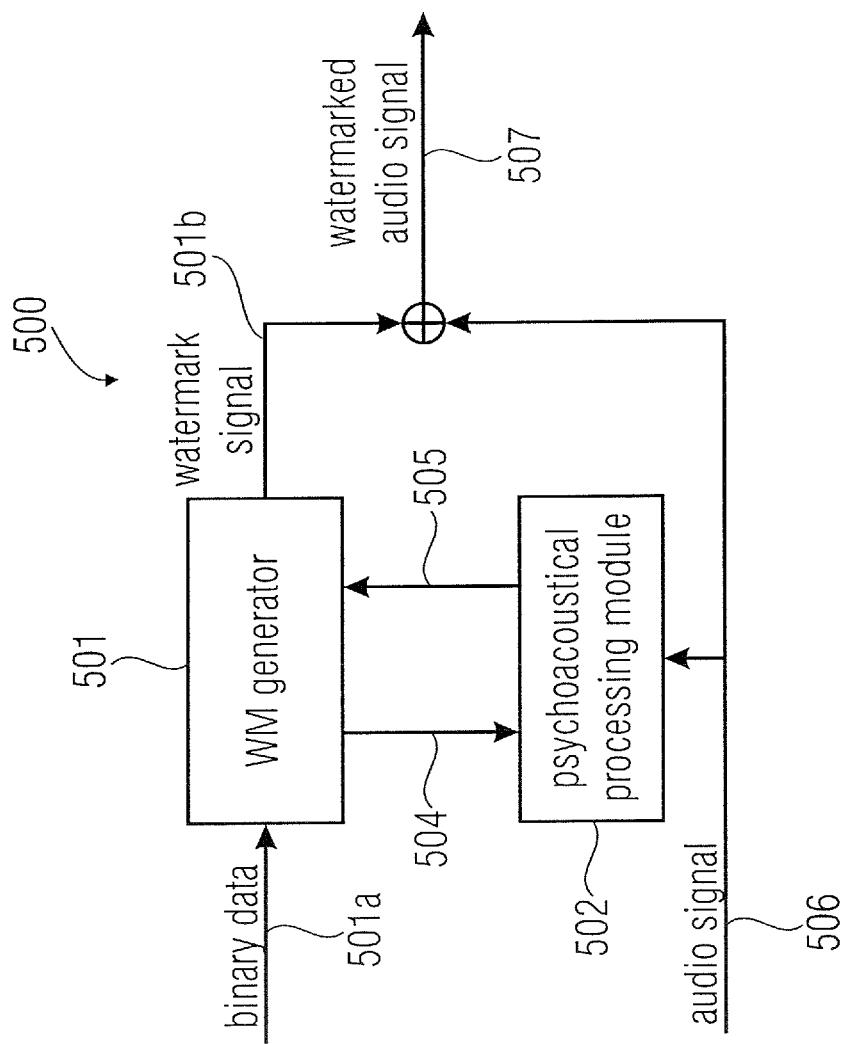
FIG. 5 depicts an apparatus for generating a watermarked signal.

FIG. 5 shows a block schematic diagram of a watermark inserter 500. At the encoder side, the watermark signal 501b is generated in the processing block 501 (also designated as watermark generator) from binary data 501a and on the basis of information 504, 505 exchanged with the psychoacoustical processing module 502. The information provided from block 502 typically guarantees that the watermark is inaudible. The watermark generated by the watermark generator 501 is added to the audio signal 506.

As already mentioned above, weighting factors γ(i, j) are needed to calculate the waveforms $s_{i,j}(t)$ for each subband. The purpose of the weighting factors γ(i, j) is to hide the watermark inaudible in the resulting watermarked signal 507. The weighting factors γ(i, j) are provided by the psychoacoustical processing module 502 which comprises 3 parts. The first part is an analysis module which transforms the time audio signal into the time/frequency domain. This analysis module may carry out parallel analyses in different time/frequency resolutions. After the analysis module, the time/frequency data is transferred to the psychoacoustic model (PAM), in which masking thresholds for the watermark signal are calculated according to psychoacoustical considerations. The masking thresholds indicate the amount of energy which can be hidden in the audio signal for each subband and time block. The last block in the psychoacoustical processing module 502 is the amplitude calculation module. This module determines the amplitude gains to be used in the generation of the watermark signal so that the masking thresholds are satisfied, i.e., the embedded energy is less or equal to the energy defined by the masking thresholds.

Figure 6A:
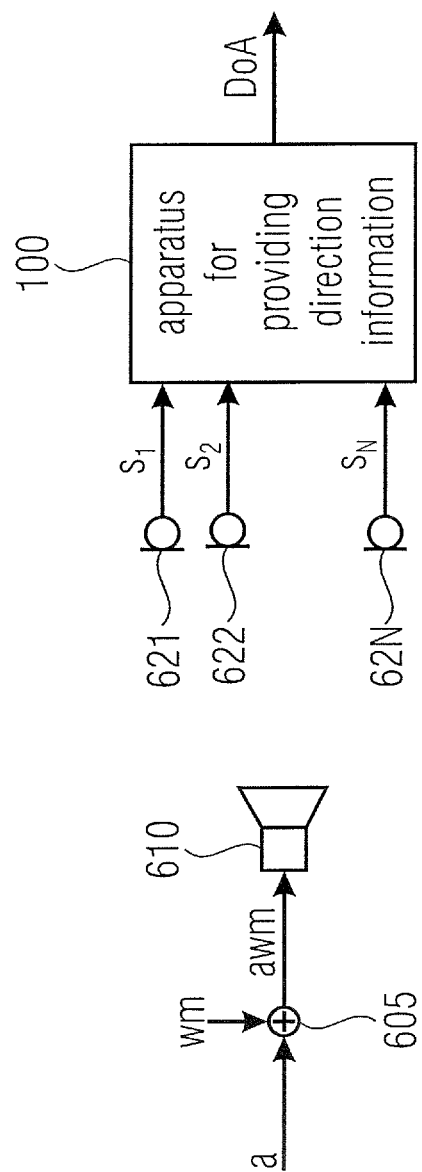
FIG. 6a-6b illustrates an apparatus for providing direction information in further application scenarios according to embodiments.

In FIG. 6a, a single loudspeaker 610 is used for the reproduction of a watermarked audio signal awm. As a first step, the watermark signal wm is combined with an audio signal a by a combination unit 605 to obtain a watermarked audio signal awm. The watermark signal wm may have been created as described with reference to FIGS. 3a-4. The watermarked signal awm may have been generated by a watermark generator as described with reference to FIG. 5. For example, the watermark signal wm may have been added to the audio signal a.

The watermarked audio signal awm resulting from the combination conducted by the combining unit 605 is then reproduced by the loudspeaker 610 and recorded by sensors 621, 622, 62N, e.g, N microphones of a microphone array such that N signals $s_1, s_2, \ldots, s_N$ are obtained. The recorded signals $s_1, s_2, \ldots, s_N$ do not only comprise the watermarked loudspeaker signals, but also comprise interfering noise, e.g. talkers in a room and effects caused by reverberation. The recorded signals $s_1, s_2, \ldots, s_N$ are then inputted into an apparatus 100 for providing direction information according to an embodiment. The apparatus 100 determines and outputs direction information, e.g. it may determine and output a direction of arrival (DoA).

Figure 6B:
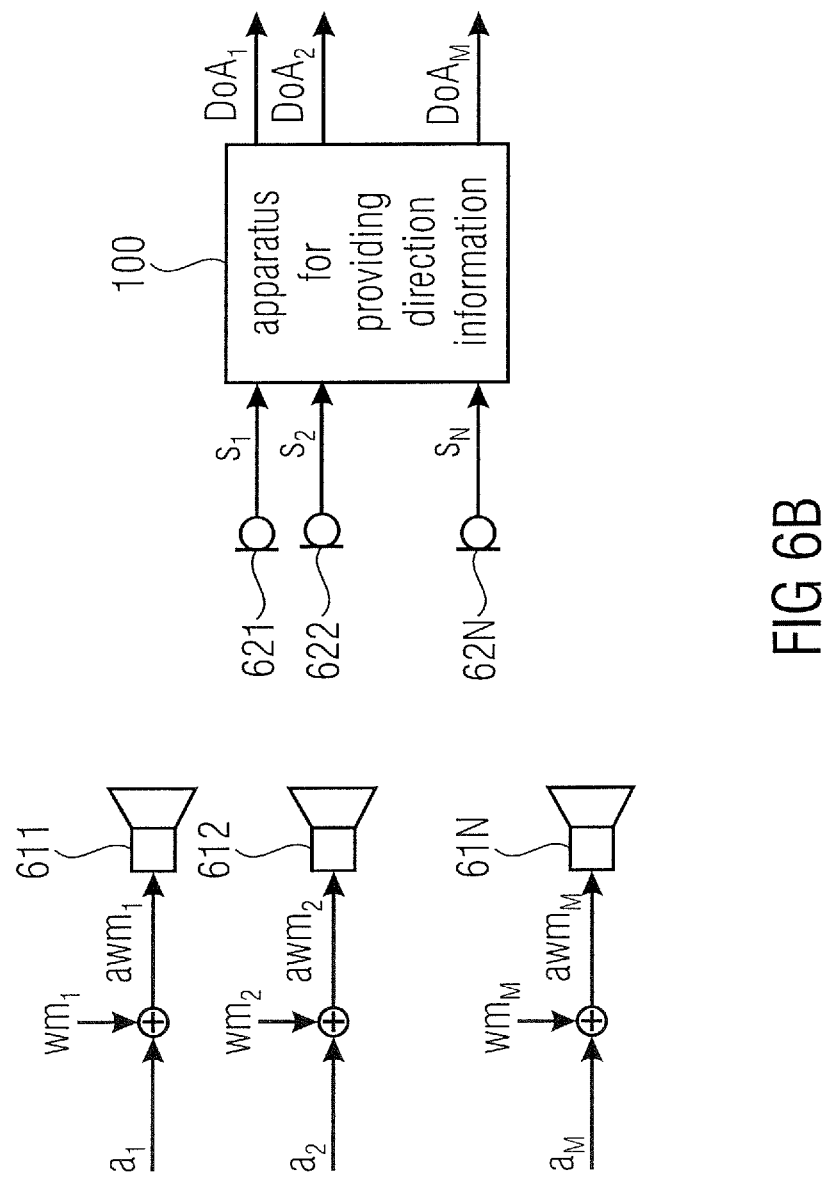

However, in other configurations, multiple loudspeakers 611, 612, . . . , 61N may be adapted to output multiple watermarked signals $awm_1, awm_2, \ldots, awm_M$. This is illustrated in FIG. 6b. Different watermark signals $wm_1, wm_2, \ldots, wm_M$ are added to audio signals $a_1, a_2, \ldots, a_M$, e.g. panned channels of an audio item used for home theater reproduction. The processing for the present scenario is similar to a situation where only one loudspeaker is reproducing a watermarked signal.

Figure 7:
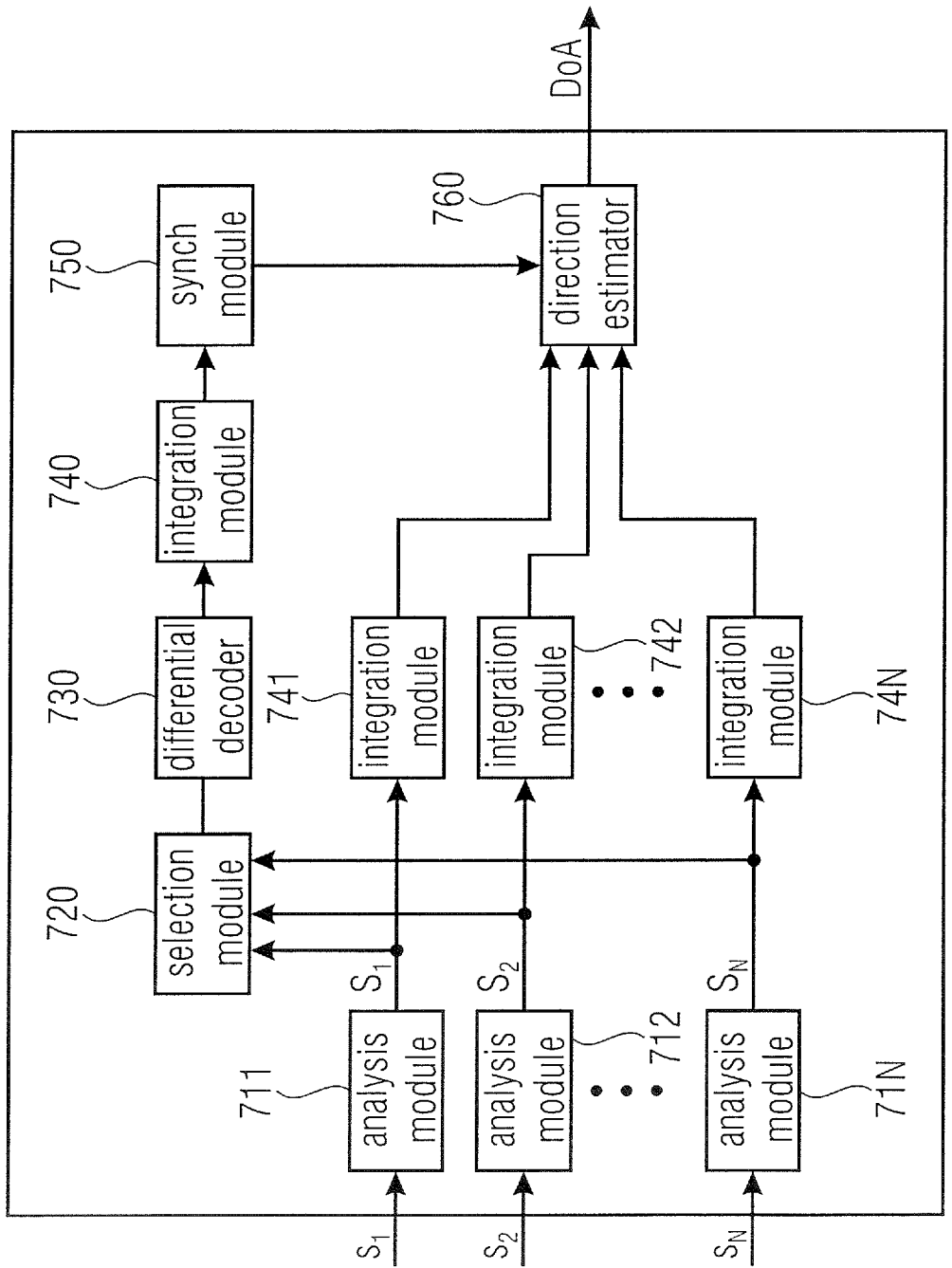
FIG. 7 illustrates the components of an apparatus for providing direction information according to an embodiment, FIG. 8a provides an exemplary overview of the location of the coefficients on the time-frequency plane when over-sampling is employed according to an embodiment.

4. Apparatus for Providing Direction Information According to FIG. 7:

FIG. 7 illustrates an apparatus 100 for providing direction information according to an embodiment. A plurality of received watermarked audio signals $s_1, s_2, \ldots, s_N$, for example signals, which may have been recorded by the microphones 621, 622, . . . , 62N depicted in FIG. 6, are illustrated. The received watermarked signals $s_1, s_2, \ldots, s_N$ which are represented in a time domain, are fed into analysis modules 711, 712, . . . , 71N for being transformed into a time-frequency domain and for being normalized.

4.1 Analysis modules 711, 712, . . . , 71N:

To explain the analysis modules 711, 712, . . . , 71N, one of the received watermarked audio signals is considered. One of the analysis modules transforms the watermarked audio signal from a time domain into the time-frequency domain by employing an analysis filter bank. The input of the filter bank is the respective watermarked audio signal. Its output are the complex coefficients $b_i^{AFB}(j)$ for the i-th branch or subband at time instant j. These values contain information about the amplitude and the phase of the signal at center frequency f, and time j·Tb.

The filter bank comprises $N_f$ branches, one for each spectral subband i. Each branch splits up into an upper subbranch for the in-phase component and a lower subbranch for the quadrature component of the subband i. Although the modulation at the watermark generator and thus the watermarked audio signal are purely real-valued, the complex-valued analysis of the signal at the receiver is needed because rotations of the modulation constellation introduced by the channel and by synchronization misalignments are not known at the receiver. In the following, we consider the i-th branch of the filter bank. By combining the in-phase and the quadrature subbranch, we can define the complex-valued baseband signal $b_i^{AFB}(t)$ as $$b_i^{AFB}(t) = r(t) \cdot e^{-j2\pi f_i t} * g_i^R(t)$$

where * indicates convolution and $g_i^R(t)$ is the impulse response of the receiver lowpass filter of subband i. Usually $g_i^R(t)$ is equal to the baseband bit forming function $g_i^T(t)$ of subband i in the modulator in order to fulfill the matched filter condition, but other impulse responses are possible as well.

In order to obtain the coefficients $b_i^{AFB}(j)$ with rate $1 = T_b$, the continuous output $b_i^{AFB}(t)$ is sampled. If the correct timing of the bits was known by the receiver, sampling with rate $1 = T_b$ would be sufficient. However, as the bit synchronization is not known yet, sampling is carried out with rate $N_{os}/T_b$ where $N_{os}$ is the analysis filter bank oversampling factor. By choosing $N_{os}$ sufficiently large (e.g. $N_{os} = 4$), we can assure that at least one sampling cycle is close enough to the ideal bit synchronization. The decision on the best oversampling layer is made during the synchronization process, so all the oversampled data is kept until then.

At the output of the i-th branch we have the coefficients $b_i^{AFB}(j,k)$, where j indicates the bit number or time instant and k indicates the oversampling position within this single bit, where k=1; 2; . . . , $N_{os}$.

Figure 8A:
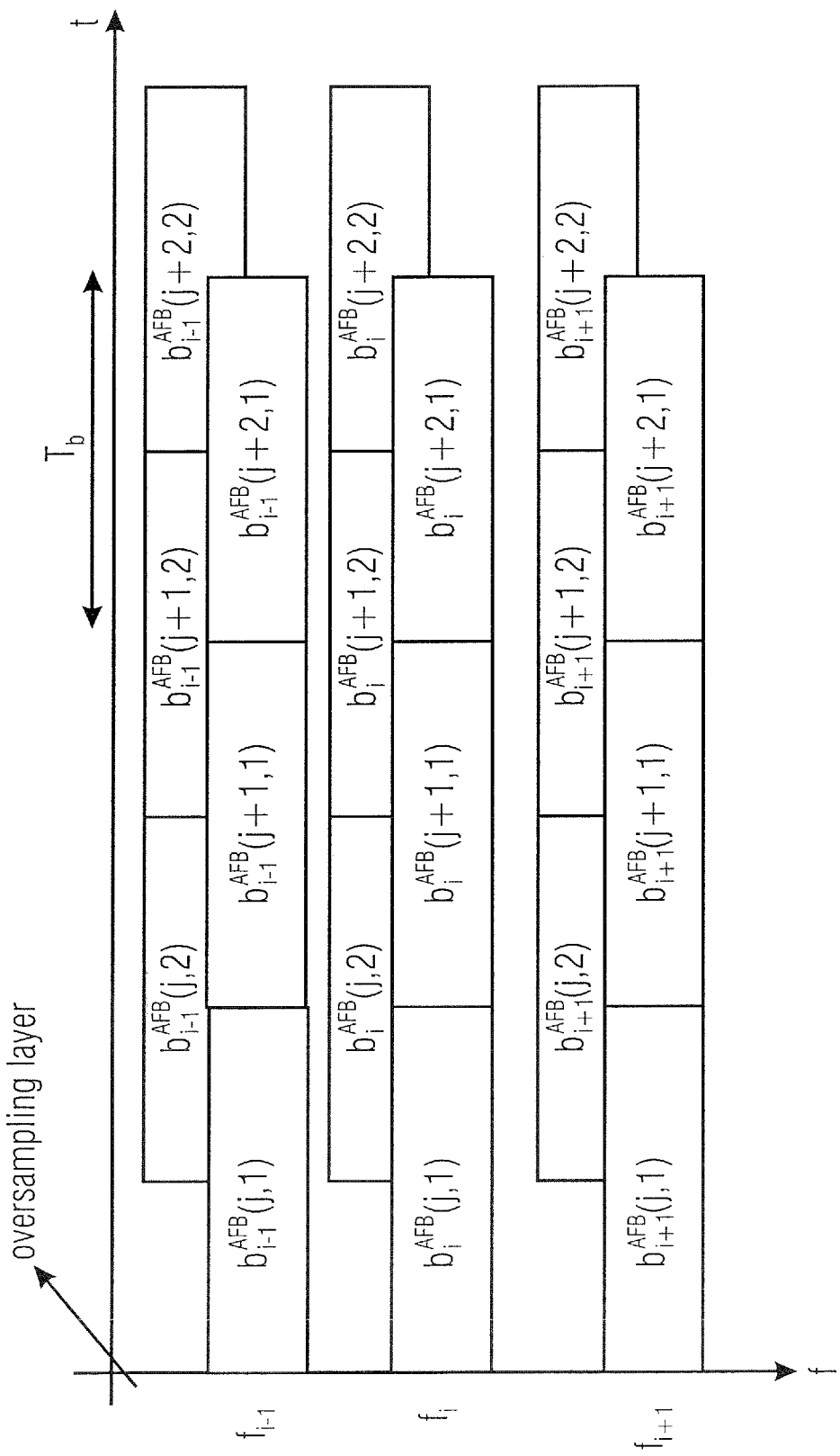
FIG. 8b illustrates a time-frequency domain subband signal comprising embedded watermarks.

FIG. 8a gives an exemplary overview of the location of the coefficients on the time-frequency plane. In FIG. 8a, the oversampling factor is $N_{os}$=2. The height and the width of the rectangles respectively indicate the bandwidth and the time interval of the part of the signal that is represented by the corresponding coefficient $b_i^{AFB}(j,k)$.

If the subband frequencies $f_i$ are chosen as multiples of a certain interval $\Delta f$, the analysis filter bank can be efficiently implemented using the Fast Fourier Transform (FFT).

Normalizing the complex coefficients obtained for each frequency band may be conducted as follows: Without loss of generality and to simplify the description, we assume in the following that the bit synchronization is known and that $N_{os}$=1. Before normalization, we have complex coefficients $b_i^{AFB}(j)$. As no channel state information is available (i.e., the propagation channel in unknown), an equal gain combining (EGC) scheme is used. Due to the time and frequency dispersive channel, the energy of the sent bit $b_i(j)$ is not only found around the center frequency $f_i$ and time instant j, but also at adjacent frequencies and time instants. Therefore, for a more precise weighting, additional coefficients at frequencies $f_i \pm n\, \Delta f$ are calculated and used for normalization of coefficient $b_i^{AFB}(j)$. If n=1 we have, for example, $$b_i^{norm}(j) = \frac{b_i^{AFB}(j)}{\sqrt{1/3 \cdot \left(|b_i^{AFB}(j)|^2 + |b_{i-\Delta f}^{AFB}(j)|^2 + |b_{i+\Delta f}^{AFB}(j)|^2\right)}}$$

The normalization for n>1 is a straightforward extension of the formula above. The normalization is carried out for each subband i and each time instant j.

Moreover, the normalization factor may be computed for one microphone only and then applied to all microphones, in case that the direction of arrival estimation uses also the amplitude of the receiver-specific information.

Figure 8B:
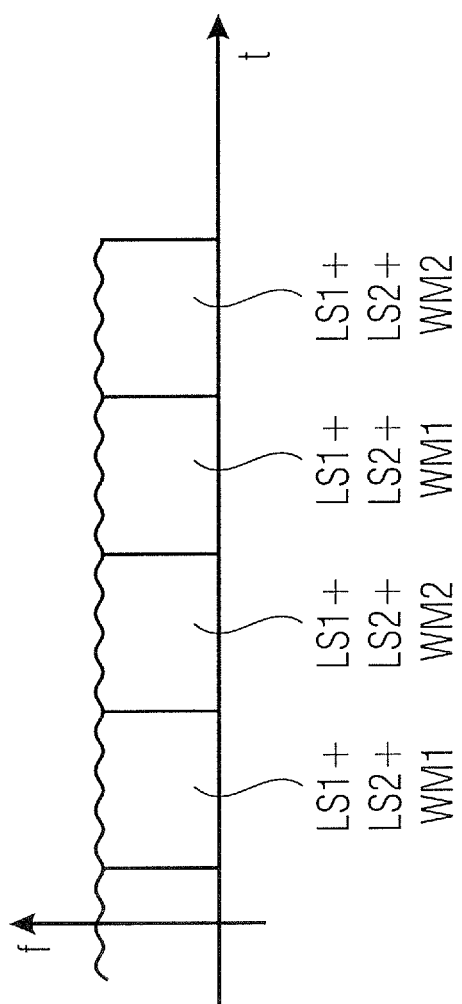

FIG. 8b illustrates a subband signal, wherein two watermark signal portions WM1 and WM2 are time-multiplexed. The subband signal comprises the sound portion of a first audio source LS1 from a first loudspeaker and the sound portion of a second sound source LS2 from a second loudspeaker. Moreover, the subband signal also either comprises the watermark signal portion WM1 from a first loudspeaker or the watermark signal portion WM2 from a second loudspeaker.

4.2 Selection Module 720:

Returning to FIG. 7, after transformation into a time-frequency domain and normalization, the time-frequency domain signals $S_1, S_2, \ldots, S_N$ are fed into a selection module 720. The selection module 720 determines which of the available signals $S_1, S_2, \ldots, S_N$ should be used to perform the subsequent synchronization. Several possibilities exist for the selection module 720 to choose between the signals. In an embodiment, the selection module 720 is adapted to choose one of the input signals $S_1, S_2, \ldots, S_N$ randomly. For example, the selection module might select the time-frequency domain signal $S_1$. In an alternative embodiment, the selection module 720 is adapted to average the signals $S_i, S_2, \ldots, S_N$ and use the averaged signal.

4.3 Differential Decoder 730:

The selection module 720 then feeds the resulting signal into a differential decoder 730. At the input of the differential decoder 730 we have amplitude normalized complex coefficients $b_i^{norm}(j)$ which contain information about the phase of the signal components at frequency $f_i$ and time instant j. As the bits are differentially encoded at the transmitter, the inverse operation is performed here. The soft bits $\hat{b}_i(j)$ are obtained by first calculating the difference in phase of two consecutive coefficients and then taking the real part:

$$\hat{b}_i(j) = \mathrm{Re}\{b_i^{norm}(j) \cdot b_i^{norm*}(j-1)\}$$
$$= \mathrm{Re}\{|b_i^{norm}(j)| \cdot |b_i^{norm}(j-1)| \cdot e^{j(\varphi_j - \varphi_{j-1})}\}$$

This has to be carried out separately for each subband because the channel normally introduces different phase rotations in each subband.

The differential decoder 730 differentially decodes the inputted signal to obtain so called soft bits by first calculating the difference in phase of two consecutive coefficients and then taking the real part of the phase. It should be noted that the resulting soft bits can take any real value and no hard decision on the bit is made yet. As the soft bits can take any real value, they do not necessarily have to be −1 or 1, but instead may have a real value different from −1 or 1, such as, for example, 0.92, −0.88, 0.97, and the like.

Moreover, when inputted into the differential decoder, the subband signal might be oversampled. The differential decoder takes oversampling into account when differentially decoding the subband signal. For example consider the case where a subband signal has been oversampled by oversampling factor q. For example, we have for the i-th subband the coefficients $b_i^{norm}(j, q)$ where j indicates the bit number or time instant and q indicates the oversampling position within this single bit, where q=1; 2; . . . , $N_{os}$. Then, with an oversampling factor q, we calculate q soft bits by applying:

$$\hat{b}_i(j,q) = \mathrm{Re}\{b_i^{norm}(j,q) \cdot b_i^{norm*}(j-1,q)\}$$

The differential decoder 730 then feeds the soft bit stream into an integration module 740, which integrates the soft bit stream in time across several synchronization signatures to further improve the accuracy of synchronization.

4.4 Integration Module 740:

The integration module 740 is now explained in more detail. When only one watermark signature wm1 produced by a single loudspeaker is employed, the watermark signature wm1 is repeatedly transmitted such that when the last bit of the watermark signature wm1 is transmitted, the first bit of the watermark signature wm1 follows next and so on. FIG. 9a depicts a corresponding sequence. If the only employed (e.g. time-spreaded) watermark signature wm1 comprises N bits, then the bit sequence is repeated after N bits, and the only watermark signature then forms the synchronization block sync of length N bits.

Figure 10:
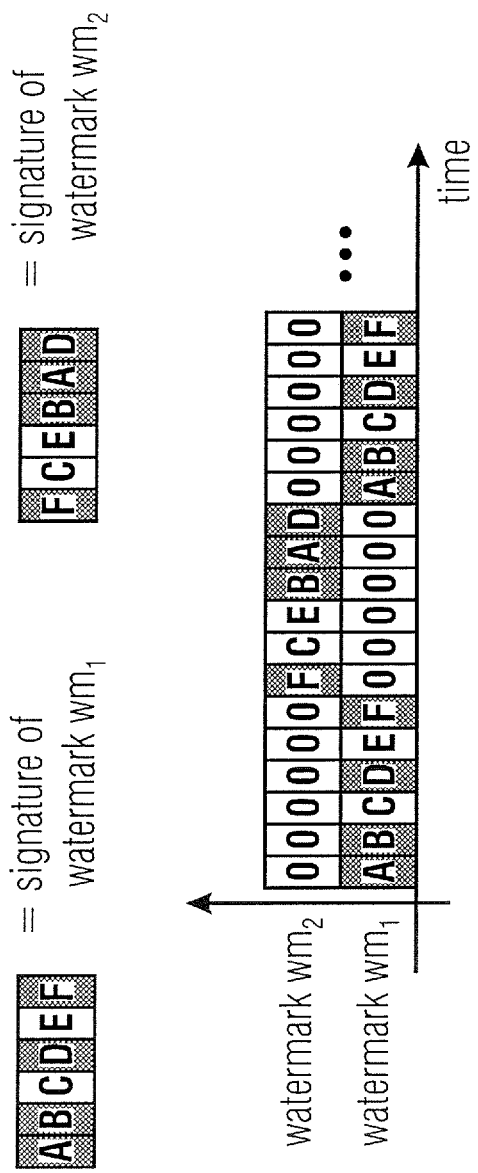
FIG. 10 illustrates multiplexed watermarks according to an embodiment.

However, as has already explained above, a system may comprise more than one loudspeaker. To obtain the estimate of the direction of arrival of each loudspeaker, it is useful to determine which part of the recorded signal was emitted by a certain loudspeaker. Therefore, the watermark signals have to be multiplexed. There are different possible methods, which are well-known in communication, namely code division multiple access (CDMA), frequency divisional multiple access (FDMA) and time division multiple access (TDMA). In an embodiment, time division multiple access is employed. To determine which parts of the recorded signal belong to a certain loudspeaker, different watermark signatures are embedded into different loudspeaker signals. FIG. 10 illustrates the time multiplexing for the use of two loudspeakers and synchronization signatures comprising six sequences.

Thus, different loudspeakers may transmit different watermarks, e.g. two watermarks wm1 wm2, which may be time-multiplexed. Let us assume that the number of bits of both (e.g. time-spreaded) watermarks is N. At first, the first watermark signature wm1 is transmitted.

Figure 9B:
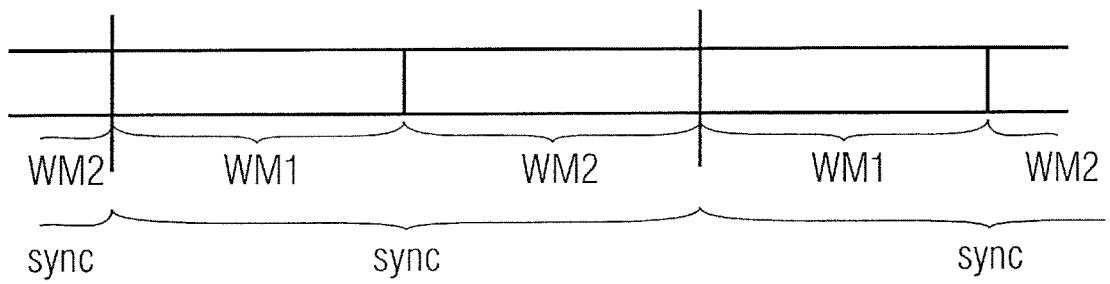

Afterwards, the second watermark signature is transmitted. Then, the first watermark signature wm1 is transmitted again, followed by the second watermark signature wm2 and so on. The synchronization block sync then comprises the watermarks wm1, wm2 and has 2·N bits. FIG. 9b depicts the described scenario with two multiplexed watermark signatures.

Each synchronization block is repeatedly transmitted. Assuming that the synchronization sequence has $N_{sync}$ bits, then bit 1 is equal to bit $N_{sync}+1$, and equal to bit $2 \cdot N_{sync}+1$, and so on. Bit 2 is equal to bit $N_{sync}+2$, and equal to bit $2 \cdot N_{sync}+2$, and so on. The resulting formula for a considered subband i is:

$$\hat{b}_i(j) = \hat{b}_i(j+N_{sync}) = \hat{b}_i(j+2*N_{sync}) = \ldots = \hat{b}_i(j+K*N_{sync}),$$
for $j=0, \ldots, N_{sync}-1$.

In case, oversampling has been conducted by the analysis modules 711, 712, ..., 71N, for example with oversampling factor $N_{os}$, then $N_{os}$ differentially decoded bit value candidates $\hat{b}_i(j, k)$ have been created for each single bit $\hat{b}(j)$ of a considered subband i. The following equation results:

$$\hat{b}_i(j,q) = \hat{b}_i(j+N_{sync},q) = \hat{b}_i(j+2 \cdot N_{sync},q) = \ldots = \hat{b}_i(j+K \cdot N_{sync},q), \text{ for } j=0, \ldots, N_{sync}-1,$$

wherein $q=1, 2, \ldots, N_{os}$ indicates the oversampling position within the considered bit.

The integration module is adapted to integrate the soft bits such that a plurality of soft bits of different synchronization blocks are added to improve robustness of the watermark decoding process.

Figure 9C:
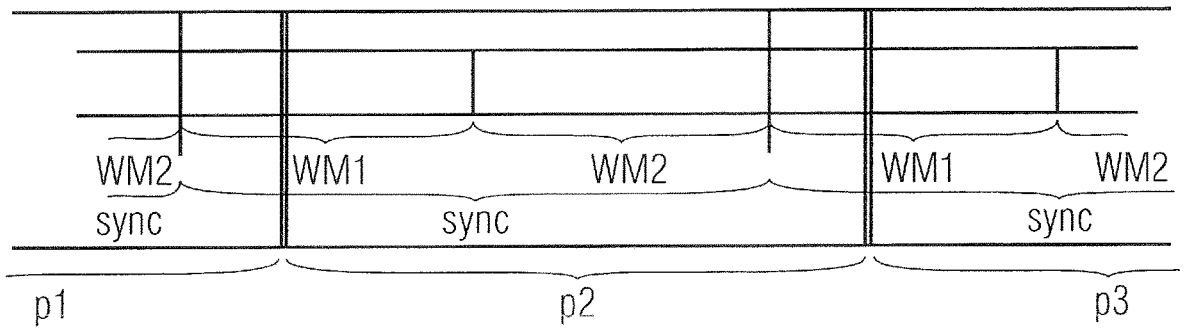

At first, the bit stream comprising the differentially decoded bits is divided in subsequent periodical blocks p1, p2, p3 having $N_{sync}$ bits. At this point, the integration module 740 is not aware of where a synchronization block starts. However, this is not necessary, as the periodicity of the differentially decoded bit stream does not depend on the starting point of the synchronization block, but instead depends on the length of the synchronization block. For that, the first bit of a synchronization block may be located somewhere within a periodical block. FIG. 9c illustrates this scenario.

To form an averaged synchronization signature block p0, corresponding bits of different periodical blocks are added. For example, the first bit of the first, second and third watermark period are added, the second bit of the first second and third watermark period are added, and so on up to the $N_{sync}$ bit of the first, second and third watermark period. Each resulting bit may be divided by the number of periodical blocks that are averaged. This results to the following formula:

$$\hat{b}_i^{avg}(j) = \frac{1}{K} \sum_{k=0}^{K-1} \hat{b}(j+k \cdot N_{sync}),$$

wherein $j=0, 1, 2, \ldots, N_{sync}-1$.

In this formula, i is the considered subband, K represents the number of synchronization blocks that are averaged, k represents the actual synchronization block that is considered, while j is the bit position considered within the periodical blocks. The averaged synchronization block has $N_{sync}$ bits: $b_i^{avg}(0), b_i^{avg}(1), b_i^{avg}(2), \ldots, b_i^{avg}(N_{sync}-1)$.

Figure 9D:
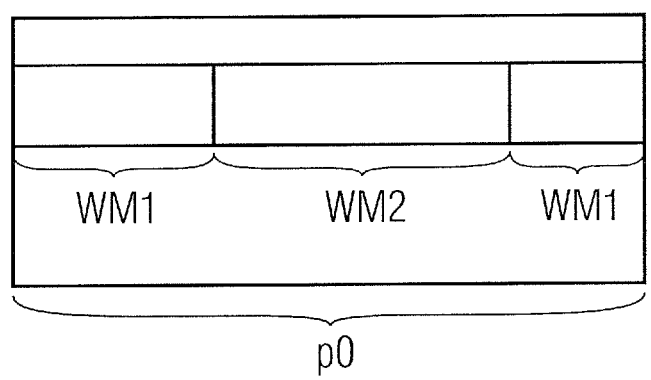

The first bit of the first watermark signature may be located somewhere in the averaged synchronization block p0. FIG. 9d illustrates the scenario showing an averaged synchronization block p0.

If the analysis in the analysis modules 711, 712, ... 71N has been conducted with an oversampling factor of $N_{os}$, then oversampling is also taken into account. In this case, averaged values are generated for all $N_{os}$ differentially decoded bit value candidates $\hat{b}(i, q)$ for each bit of the periodical blocks. This results in the formula:

$$\hat{b}_i^{avg}(j, q) = \frac{1}{K} \sum_{k=0}^{K-1} \hat{b}(j+k \cdot N_s, q),$$

wherein $j=0, 1, 2, \ldots, N_{sync}-1$
wherein $q=1, 2, \ldots, N_{os}$ indicates the oversampling position within the considered bit.

The integration conducted by integration module 740 produces averaged soft bits or in case of oversampling, a plurality of $N_{os}$ soft bit value candidates for each one of the bits of the averaged synchronization block p0.

In further embodiments where speech signals act as watermark carriers, integration is particularly important, since they often contain gaps with no watermark signal. By this, errors that are existent in the soft bit stream will normally be reduced when integration in time is conducted.

4.5 Synchronization Module 750:

After the bit stream has been integrated in time, the integration module 740 feeds the integrated soft bit stream into a synchronization module 750 which performs a robust synchronization. In more detail, the synchronization module 750 performs a correlation with the embedded synchronization signature. Resulting from this is a synchronization hit position. Synchronization in the synchronization module 750 will now be explained in more detail.

The task of the synchronization module 750 is to find the temporal alignment of the one or more watermarks within the averaged synchronization block.

Figure 12B:
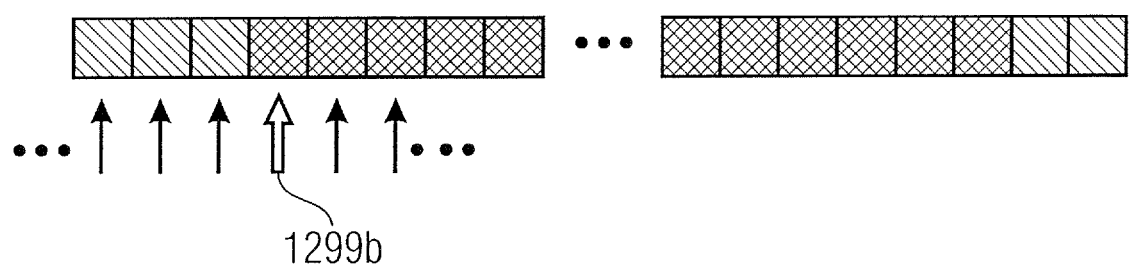
FIG. 12b shows a graphical representation of the problem of identifying the message start.

The problem of synchronizing the decoder to the encoded data is twofold. In a first step, the analysis filter bank is aligned with the encoded data, namely the bit shaping functions $g_i^T(t)$ used in the synthesis in the modulator are aligned with the filters $g_i^R(t)$ used for the analysis. This problem is illustrated in FIG. 12a, where the analysis filters are identical to the synthesis ones. At the top, three bits are visible. For simplicity, the waveforms for all three bits are not scaled. The temporal offset between different bits is $T_b$. The bottom part illustrates the synchronization issue at the decoder: the filter can be applied at different time instants, however, only curve 1299a is correct and allows to extract the first bit with the best signal to noise ratio SNR and signal to interference ratio SIR. In fact, an incorrect alignment would lead to a degradation of both SNR and SIR. We refer to this first alignment issue as "bit synchronization". Once the bit synchronization has been achieved, bits can be extracted optimally. However, it may also be useful to know where a watermark signature starts. This issue is illustrated in FIG. 12b and is referred to as message synchronization.

In the stream of decoded bits only the starting position marked by a bold arrow 1299b is correct and allows to decode the k-th message.

To explain the basic synchronization concept we first refer to a system wherein only one loudspeaker outputs a single watermark signature. Therefore the averaged synchronization block only comprises the bits of the single watermark signature. The watermark signature may also be referred to as synchronization signature.

Moreover, we will refer to the term synchronization sequence. A synchronization signature may comprise a plurality of synchronization sequences. In the simplest case, the synchronization sequence may only comprise a single bit. However, it is also possible that a synchronization signature comprises a plurality of bits.

We first address message synchronization. The synchronization signature is assumed to be composed of $N_s$ synchronization sequences in a predetermined order which are embedded continuously and periodically in the watermarked audio signal. The synchronization module 750 is capable of retrieving the temporal alignment of the synchronization sequences.

The synchronization module can identify the beginning of each synchronization signature by finding the temporal alignment of the synchronization sequences. We refer to the temporal positions at which a new synchronization signature starts as synchronization hits.

Figure 11A:
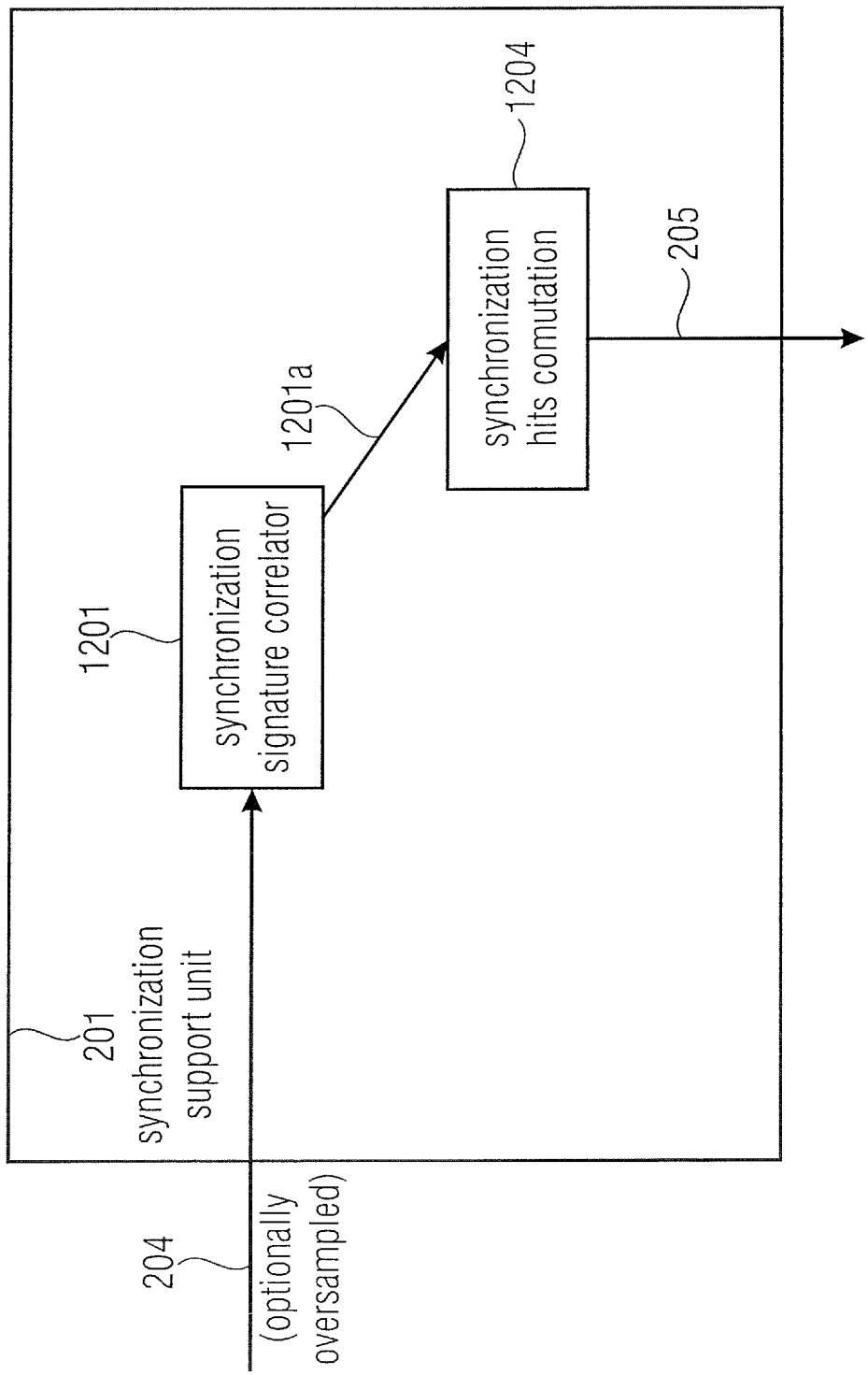
FIG. 11a-11b show block-schematic diagrams of implementation alternatives of a synchronization support unit.
Figure 11B:
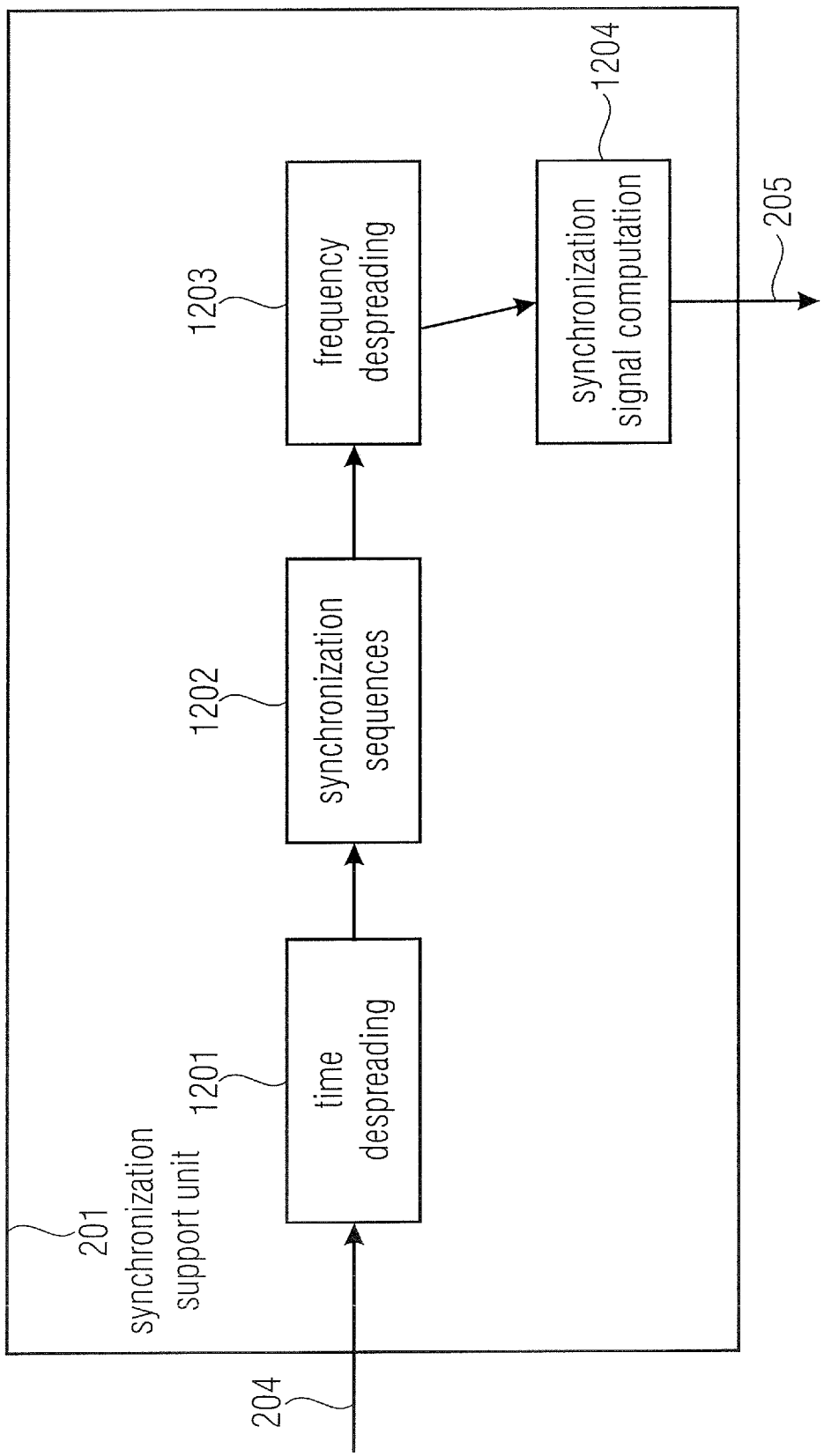

The processing blocks of the synchronization module are depicted in FIGS. 11a and 11b. The synchronization support unit carries out the bit synchronization and the message synchronization at once by analyzing the output of the synchronization signature correlator 1201. The data in time/frequency domain 204 is provided by the analysis module. As the bit synchronization is not yet available, the analysis module oversamples the data with factor $N_{os}$.

An illustration of the input data is given in FIG. 12c. For this example we have taken $N_{os}=4$, $N_t=2$, and $N_s=3$. Again, $N_{os}$ indicates the oversampling factor, $N_t$ indicates a time-spreading factor and $N_s$ indicates the number of synchronization sequences. Thus, in other words, the synchronization signature consists of 3 sequences (denoted with a, b, and c). The time spreading, in this case with spreading sequence $c_t=[1\ 1]^T$, simply repeats each bit twice in time domain.

The exact synchronization hits are denoted with arrows and correspond to the beginning of each synchronization signature. The period of the synchronization signature is $N_t \cdot N_{os} \cdot N_s = N_{sbl}$ which is $2 \cdot 4 \cdot 3 = 24$.

Due to the periodicity of the averaged synchronization block, it is sufficient to only consider the averaged synchronization block as outputted by the integration module 740. The synchronization block may contain (or typically contains) one synchronization hit as depicted in FIG. 12d. Each of the bits of the averaged synchronization block is a candidate synchronization hit. In FIG. 12d, the averaged synchronization block is illustrated in duplicated form in the figures only for illustrative purposes. Block 1201's task is to compute a likelihood measure for each of candidate bit of the synchronization block. This information is then passed to block 1204 which computes the synchronization hits.

Figure 11C:
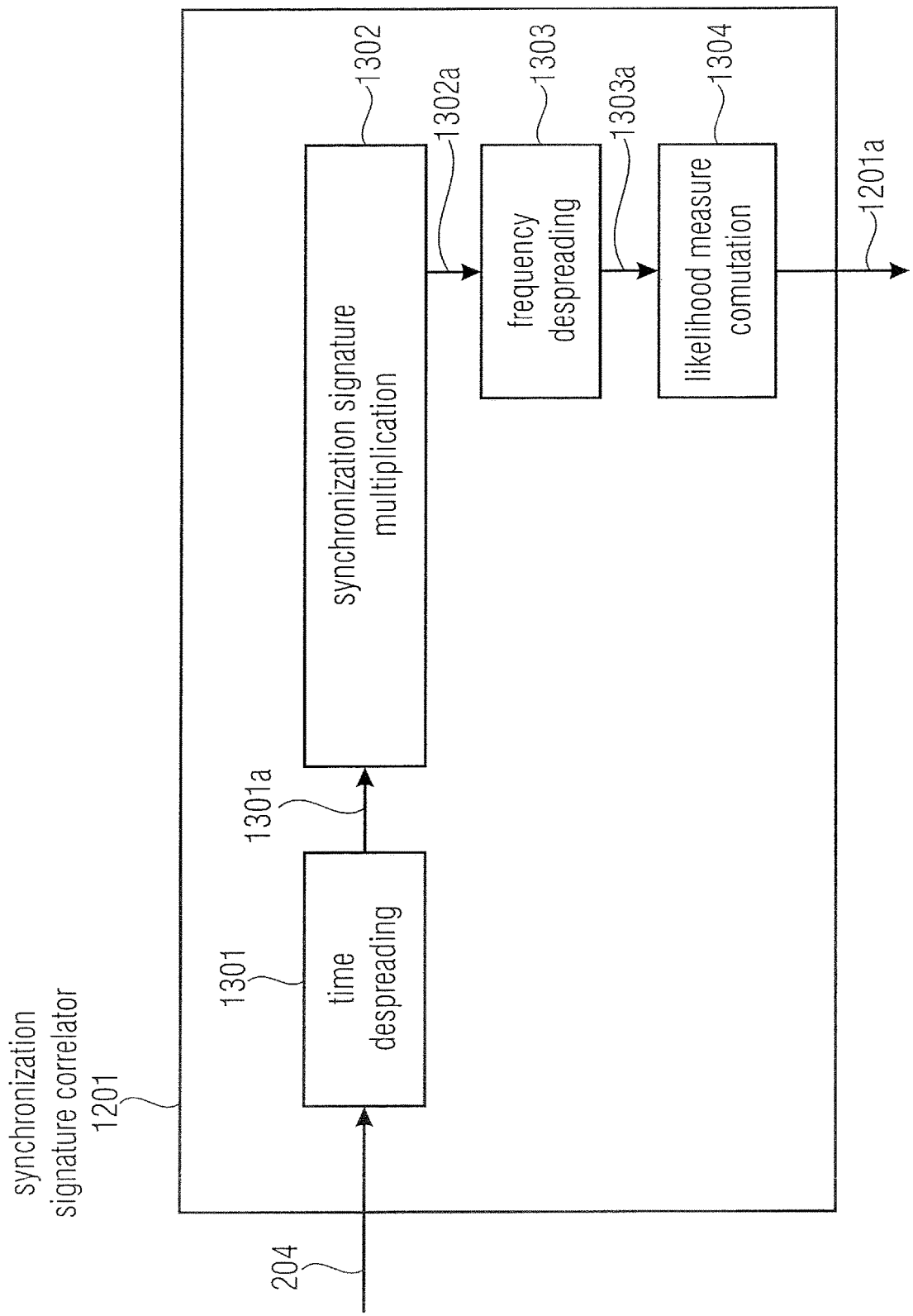
FIG. 11c shows a block-schematic diagram of a synchronization signature correlator.

For each of the $N_{sbl}$ candidate synchronization positions the synchronization signature correlator computes a likelihood measure, the latter is larger the more probable it is that the temporal alignment (both bit and partial or full message synchronization) has been found. The processing steps are depicted in FIG. 11c.

Accordingly, a sequence 1201a of likelihood values, associated with different positional choices, may be obtained. Block 1301 carries out the temporal despreading, i.e., multiplies every $N_t$ bits with the temporal spreading sequence $c_t$ and then sums them. This is carried out for each of the $N_f$ frequency subbands.

Figure 13A:
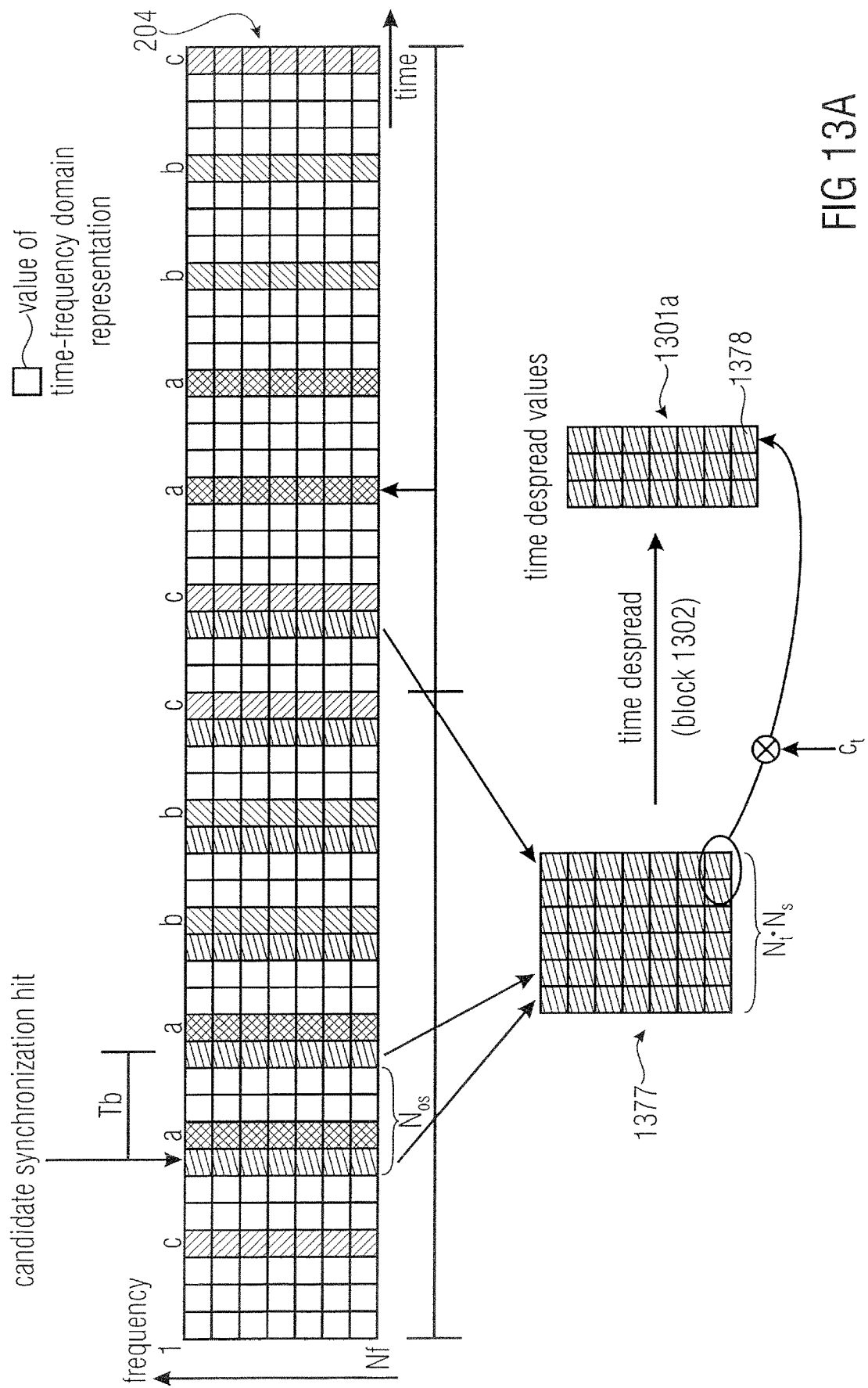
FIG. 13a shows a graphical representation of an example for a temporal despreading.

FIG. 13a shows an example. We take the same parameters as described in the previous section, namely $N_{os}=4$, $N_t=2$, and $N_s=3$. The candidate synchronization position is marked. From that bit, with $N_{os}$ offset, $N_t \cdot N_s$ are taken by block 1301 and time despread with sequence $c_t$, so that Ns bits are left.

Figure 13B:
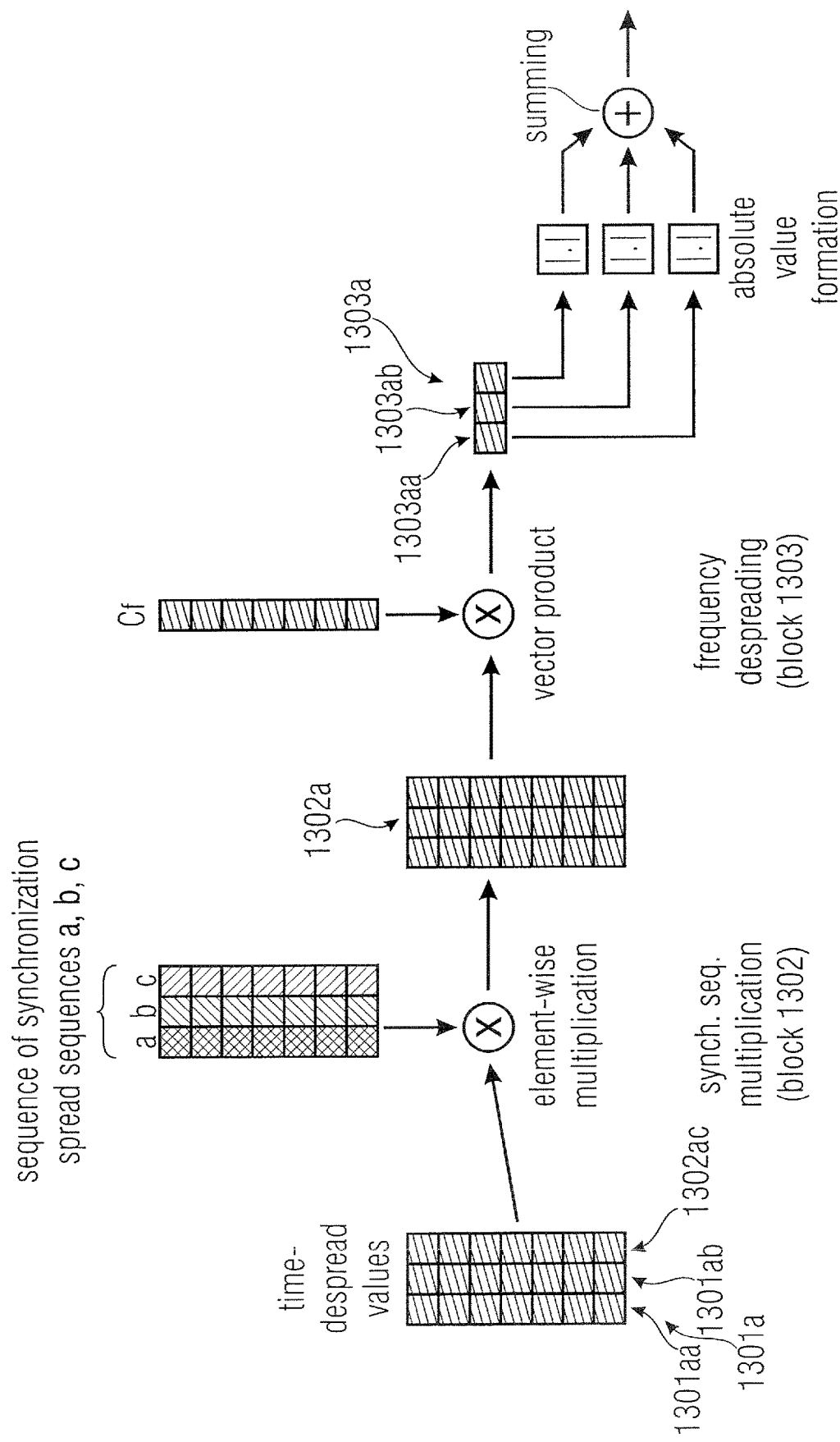
FIG. 13b shows a graphical representation of an example for an element-wise multiplication between bits and spreading sequences.

In block 1302 the bits are multiplied element-wise with the $N_s$ spreading sequences (see FIG. 13b).

In block 1303 the frequency despreading is carried out, namely, each bit is multiplied with the spreading sequence $c_f$ and then summed along frequency.

At this point, if the synchronization position were correct, we would have $N_s$ decoded bits. As the bits are not known to the receiver, block 1304 computes the likelihood measure by taking the absolute values of the $N_s$ values and sums.

The output of block 1304 is in principle a non coherent correlator which looks for the synchronization signature. In fact, when choosing a small $N_s$, namely the partial message synchronization mode, it is possible to use synchronization sequences (e.g. a, b, c) which are mutually orthogonal. In doing so, when the correlator is not correctly aligned with the signature, its output will be very small, ideally zero. When using the full message synchronization mode it is advised to use as many orthogonal synchronization sequences as possible, and then create a signature by carefully choosing the order in which they are used. In this case, the same theory can be applied as when looking for spreading sequences with good auto correlation functions. When the correlator is only slightly misaligned, then the output of the correlator will not be zero even in the ideal case, but anyway will be smaller compared to the perfect alignment, as the analysis filters cannot capture the signal energy optimally.

Figure 13C:
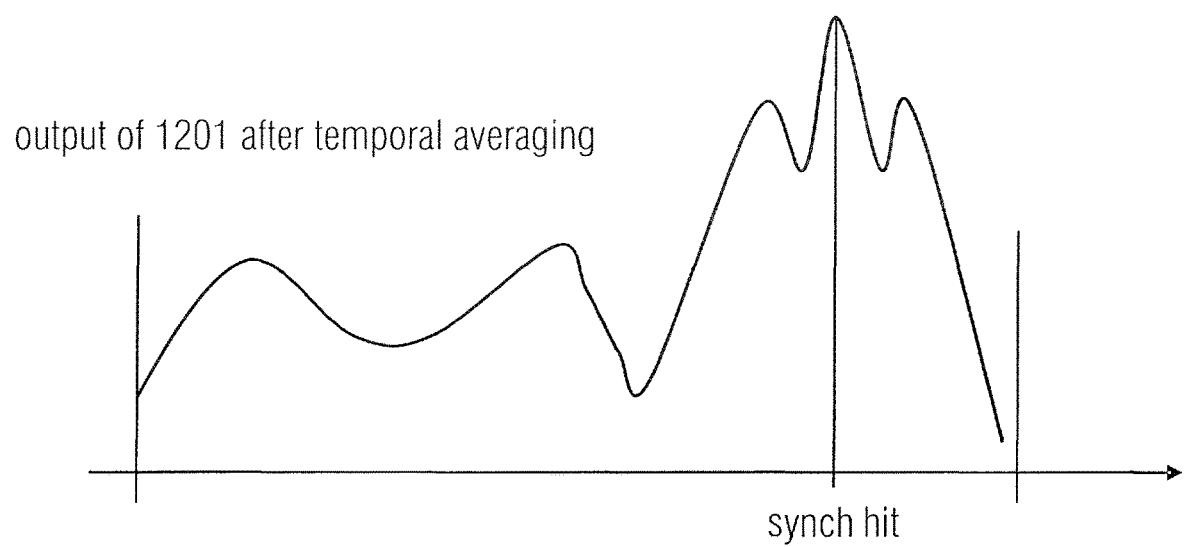
FIG. 13c shows a graphical representation of an output of the synchronization signature correlator after temporal averaging.
Figure 13D:
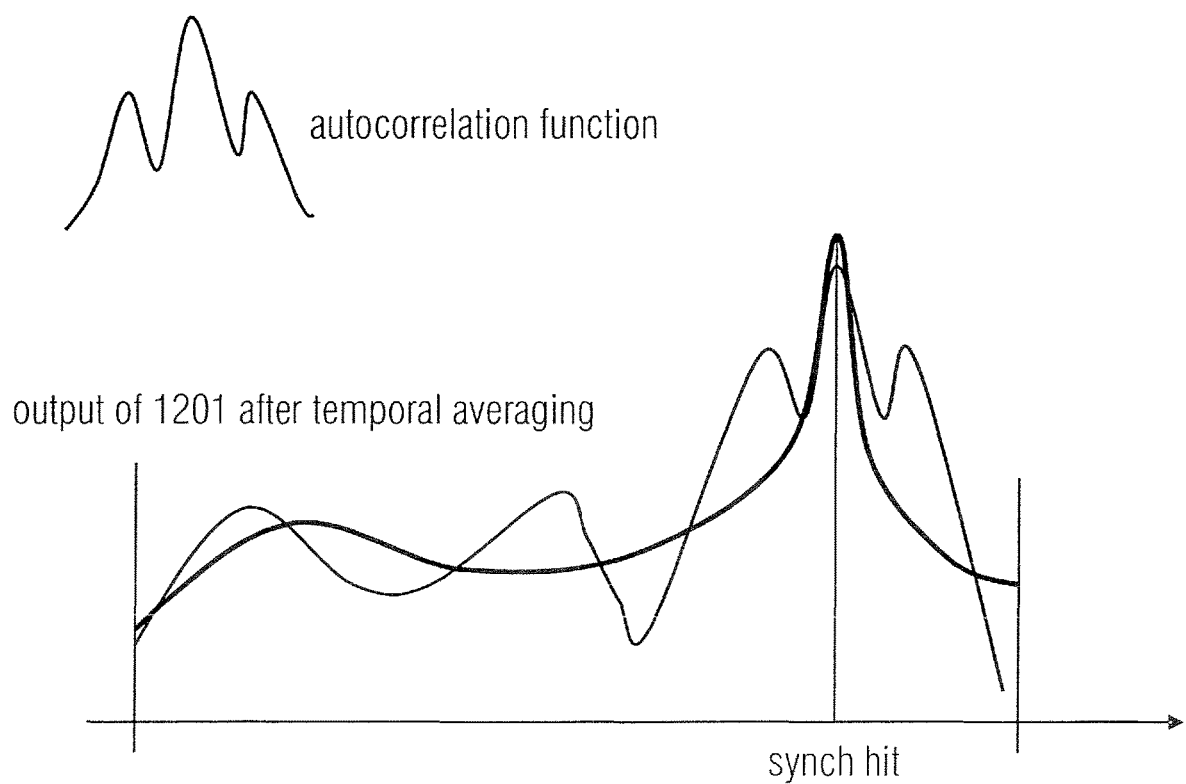
FIG. 13d shows a graphical representation of an output of the synchronization signature correlator filtered with the auto-correlation function of the synchronization signature.

This synchronization hits computation block analyzes the output of the synchronization signature correlator to decide where the synchronization positions are. Since the system is fairly robust against misalignments of up to $T_b/4$ and the $T_b$ is normally taken around 40 ms, it is possible to integrate the output of 1201 over time to achieve a more stable synchronization. A possible implementation of this is given by an IIR filter applied along time with a exponentially decaying impulse response. Alternatively, a traditional FIR moving average filter can be applied. Once the averaging has been carried out, a second correlation along different $N_t \cdot N_s$ is carried out ("different positional choice"). In fact, we want to exploit the information that the autocorrelation function of the synchronization function is known. This corresponds to a Maximum Likelihood estimator. The idea is shown in FIG. 13c. The curve shows the output of block 1201 after temporal integration. One possibility to determine the synchronization hit is simply to find the maximum of this function. In FIG. 13d we see the same function (in black) filtered with the autocorrelation function of the synchronization signature. The resulting function is indicated by the broader line. In this case the maximum is more pronounced and gives us the position of the synchronization hit. The two methods are fairly similar for high SNR but the second method performs much better in lower SNR regimes. Once the synchronization hits have been found, they are passed to the watermark extractor 202 which decodes the data.

More than One Watermark Signature:

A system may also employ two or more watermark signatures outputted by different loudspeakers, wherein the watermark signatures are time-multiplexed. FIG. 10 illustrates such time multiplexed watermark signatures In such a case, the synchronization module 750 searches separately for each one of the embedded watermark signatures. Therefore, it detects as many synchronization hit positions as loudspeakers and different watermark signals are used and delivers these synchronization hit positions to the direction estimator 760.

According to this, the above-described concept to find a synchronization hit position of a synchronization signature is repeatedly applied for each watermark. Thus, for each watermark, a synchronization hit position within the averaged synchronization block is determined. Determination of the synchronization hit position of each watermark is repeatedly conducted as explained with reference to FIG. 11a-13d for each one of the watermarks, wherein the watermark signature of the considered watermark is employed as synchronization signature The recorded signal is then divided into M segments, each segment M belonging to a certain watermark of a certain loudspeaker. The estimation of the direction of arrival is then carried out for each segment. As a result, the direction estimator 760 will have M outputs, each representing the direction of arrival of sound emitted by a certain loudspeaker.

The synchronization module 750 provides the one or more synchronization hit position within the averaged synchronization block and delivers the synchronization hit position to a direction estimator 760.

In other embodiments, it may not be necessary that the synchronization hits are calculated if the watermark is embedded continuously and only one loudspeaker is used. If this is not the case, the synchronization has to be preformed to find the starting point for the direction estimation.

4.6 Integration Modules 741, 742, . . . 74N:

Returning to FIG. 7, the analysis modules 711, 712, . . . , 71N not only provide the time-frequency domain signals $S_1, S_2, \ldots, S_N$ to the selection module 720, but also provide the signals $S_1, S_2, \ldots, S_N$ to integration modules 741, 742, . . . , 74N. What is delivered to the integration modules 741, 742, . . . , 74N are in fact the (oversampled) normalized complex coefficients $b_i^{norm}(j,q)$ which are the same coefficients as provided to the selection module 720.

However, no differential decoding is performed before the oversampled normalized complex coefficients are fed into the integration modules 741, 742, . . . , 74N, as the phase information comprised in the complex coefficients is needed, which would be lost after a differential decoding. Instead, the phase information of the signal has to be kept. By applying differential decoding, this information would be discarded.

In each one of the integration modules 741, 742, . . . , 74N and for each subband i, at first, the stream comprising the oversampled normalized complex coefficients is divided in subsequent periodical blocks p11, p12, p13. The complex coefficient stream is divided in exactly the same way in blocks as the differentially decoded bit stream has been separated into periodical blocks p1, p2, p3. Bits and samples with corresponding time indexes and (oversampling positions) are comprised in corresponding periodical blocks.

This is explained with reference to FIGS. 7 and 14. In FIG. 7, a signal s1 may be provided to the analysis module 711. The analysis module 711 generates a time-frequency domain signal S1 comprising a plurality of subband signals, each one of the subband signals being represented as a stream of complex coefficients. In an embodiment, the selection module 720 may select S1 such that the subsequent synchronization is performed based on the time-frequency domain signal S1.

Figure 14:
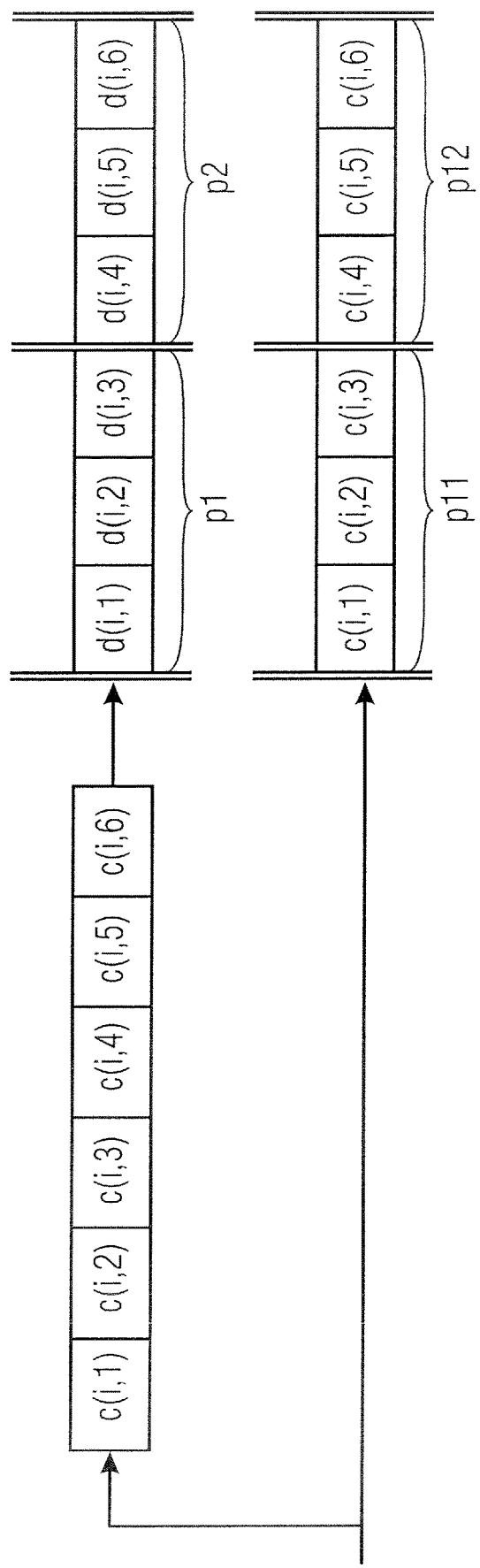
FIG. 14 illustrates the relationship of periodical blocks comprising differentially decoded bits and periodical blocks comprising complex coefficients.

In FIG. 14, a particular subband of the time-frequency domain signal S1 is considered. This subband may comprise complex coefficients c(i,j), wherein i denotes the subband and j denotes the time index. For example, consider the complex coefficients c(i, 1), c(i, 2), c(i, 3), c(i, 4), c(i, 5) and c(i, 6) of this subband. Differential decoding based on these values by a differential decoder provides six soft bits, namely d(i, 1) based on c(i, 1) and the preceding subband sample; d(i, 2) based on c(i, 2) and the preceding c(i, 1); d(i, 3) based on c(i, 3) and the preceding c(i, 2); d(i, 4) based on c(i, 4) and the preceding c(i, 3); d(i, 5), based on c(i, 5) and the preceding c(i, 4); and d(i, 6) based on c(i, 6) and the preceding c(i, 5). In d(i, j), i represents the subband and j represents the time index.

The complex coefficients of the frequency band i are also fed into the integration module 741 of FIG. 7. If integration module 740 now divides the differentially decoded bit stream comprising the soft bits d(i, 1), d(i, 2), d(i, 3), d(i, 4), d(i, 5), d(i, 6) into a first periodical block p1 comprising d(i, 1), d(i, 2) and d(i, 3) and into a second periodical block p2 comprising d(i, 4), d(i, 5) and d(i, 6) then the complex coefficients c(i, 1), c(i, 2), c(i, 3), c(i, 4), c(i, 5) and c(i, 6) are also divided into two blocks, namely a first block comprising the complex coefficients c(i, 1), c(i, 2) and c(i, 3) and into a second block comprising the complex coefficients c(i, 4), c(i, 5) and c(i, 6) (see FIG. 14).

The same applies for other time-frequency domain signals $S_N$ generated by other analysis modules 71N even if these signals have not been used for the differential deconding performed by the differential decoder.

The above-described concept is equally applicable if oversampling is taken into account. If the oversampled soft bits b(i, j, q) are divided into a first and a second periodical block p1 and p2, then the complex coefficients c(i, j, q) are also divided into two blocks p11 and p12. (Here, i indicates the subband, j indicates the time index and q indicates the oversampling position.) If the first periodical block p1 comprises soft bit b(i, j, q), then the first block p11 comprises complex coefficient c(i, j, q) with the same indexes j, q. If the second periodical block p2 comprises soft bit b(i, j, q), then the second block p12 also comprises the complex coefficient c(i, j, q) with the same indexes j, q.

Thus, the length of each one of the periodical blocks p11, p12, p13 generated by the integration modules 741, 742, . . . , 74N corresponds to the length of the periodical blocks p1, p2, p3 generated by the integration module 740.

To form an averaged periodical block for each subband i, corresponding complex coefficients are averaged. For example, corresponding complex coefficients of different periodical blocks are added. For example, the first complex coefficient of the first, second and third synchronization period are added, the second complex coefficient of the first second and third watermark period are added, and so on. Each resulting complex coefficient may be divided by the number of periodical blocks that are averaged. This results to the following formula:

$$s_i^{avg}(j) = \frac{1}{K}\sum_{k=0}^{K-1} b_i^{norm}(j+k \cdot N_s),$$

wherein j=0, 1, 2, . . . , $N_{sync}$−1.

In this formula, K represents the number of periodical blocks of a considered subband i that are averaged, k represents the actual periodical block that is considered, while j is the position of the complex coefficient within the periodical blocks.

Taking oversampling with an oversampling factor of $N_{os}$ into account, this results in the formula:

$$s_i^{avg}(j, q) = \frac{1}{K}\sum_{k=0}^{K-1} b_i^{norm}(j + k \cdot N_s, q),$$

wherein j=0, 1, 2, ..., $N_{sync}-1$
wherein q=1, 2, ..., $N_{os}$ indicates the oversampling position within the considered complex coefficient.

An averaged periodical block is determined for each frequency band and each signal.

Figure 15A:
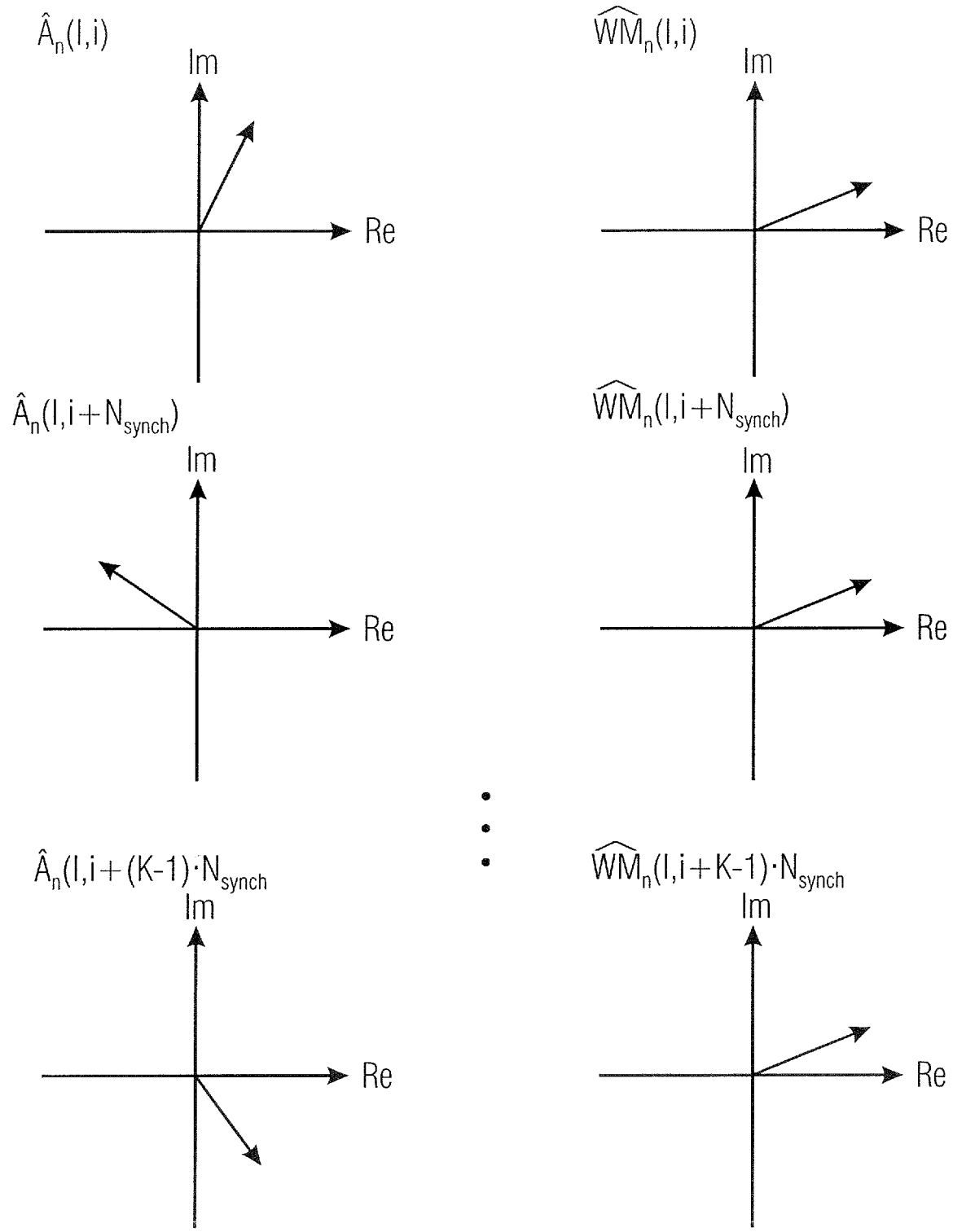
FIG. 15a depicts complex vectors of an audio signal portion and of a watermark signal portion.
Figure 15B:
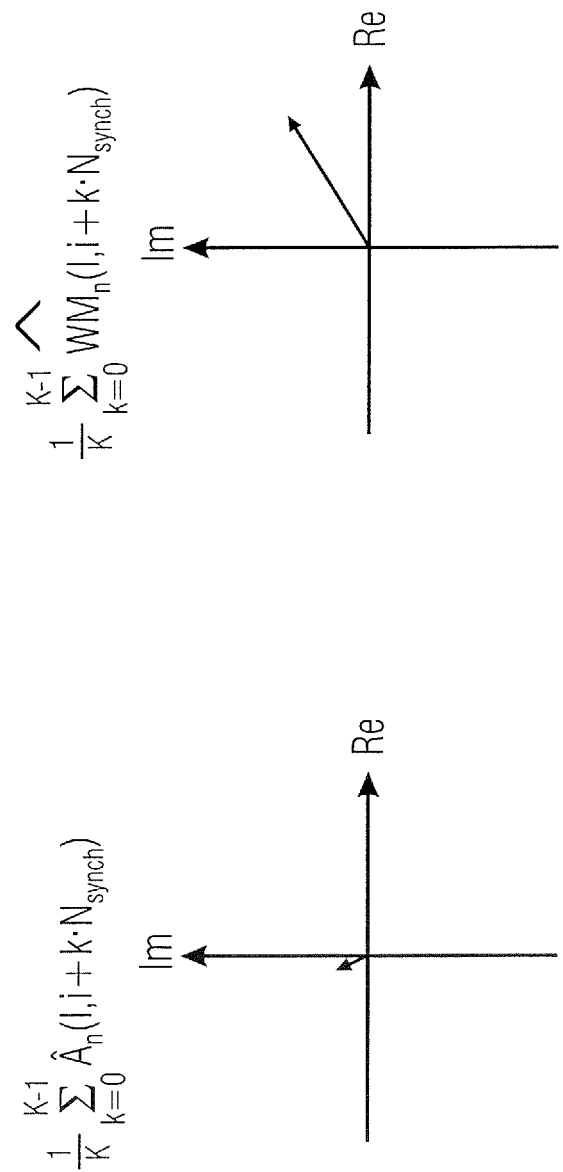
FIG. 15b depicts an averaged complex vector of audio signal portions and an averaged complex vector of watermark signal portions.

This effect of forming averaged periodical blocks is explained with reference to FIG. 15a and FIG. 15b. FIGS. 15a and 15b illustrate how the integration helps in acquiring the wanted phase information of the watermark signal.

When using several loudspeakers, a well-known phenomenon arises, namely the phantom image source. In this scenario, the emitted sound is perceived as if it was played by a source located between the loudspeakers. This is also the case for the estimation of the direction of arrival, since the audio part of the recorded watermark signal doubles proportionally to the watermark part. A solution for this problem is the use of the integration modules 441, 442, . . . , 44N, what is now explained in more detail.

Figure 15C:
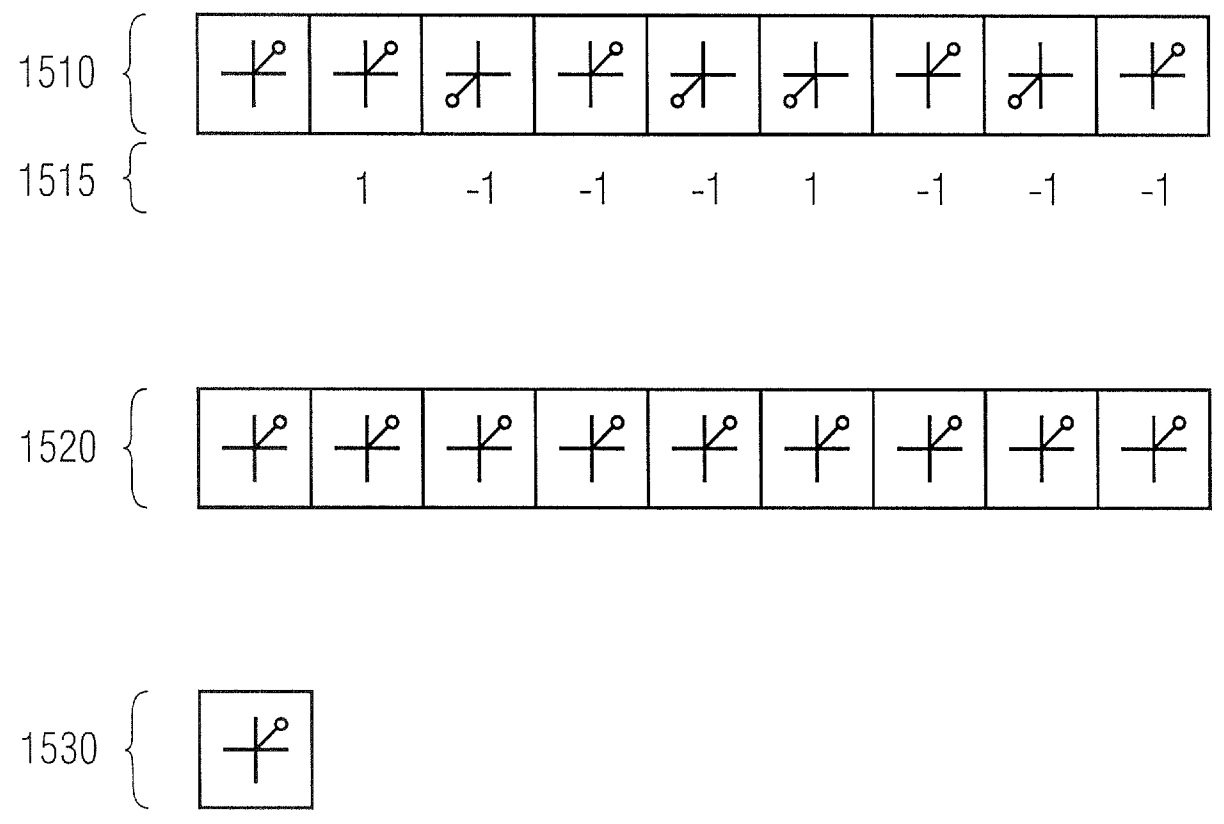

FIG. 15a shows the complex vector of the audio part $$\hat{A}_n = \sum_{m=1}^{M} A_{mn}$$

and of the watermark signal part $\overrightarrow{WM}_n 5$ of a recorded and analyzed signal $S_n$ for a certain frequency subband l and different time slots i by assuming an ideal channel. Here, $A_{mn}$ represents the audio part emitted by loudspeaker m and received at microphone n. It should be noted that in the TDMA example, when looking at the given time slots, the recorded signal comprises the superposition of all emitted audio signals together with only one watermark signal. K represents the number of synchronization blocks to be integrated. $N_{synch}$ represents the number of time slots for one complete synchronization block. It comprises the different synchronization signatures for all loudspeakers:

$$N_{synch} = M \cdot N_{seq},$$

where M is the number of loudspeakers and $N_{seq}$ is the number of sequences of one synchronization signature. The complex vector of the audio portion rotates from one time slot to another. On the contrary, the phase of the watermark signal stays however nearly the same.

In FIG. 15b, the situation is illustrated after the integration was performed. The complex vector of the resulting audio signal $$\frac{1}{K}\sum_{k=0}^{K-1} \hat{A}_n(l, i + k \cdot N_{synch})$$

nearly disappears, whereas the vector of the obtained watermark $$\frac{1}{K}\sum_{k=0}^{K-1} \overrightarrow{WM}_n(l, i + k \cdot N_{synch})$$

remains. Therefore, methods which achieve an estimation of the incidence angle by using the phase information of the recorded input signals receive useable data to obtain a feasible estimate for the direction of arrival of each loudspeaker.

After bit integration, an integrated complex coefficient for each received signal $S_1, S_2, \ldots, S_N$ of the different microphones 611, 612, . . . , 61N and for each frequency band i is available.

For the moment, we will not take oversampling into account and explain some principles on which the present invention is based. Phase modulation as employed in the context of this embodiment is based on some fundamental ideas: Assuming that each sampled complex coefficient corresponds to an encoded bit position, the phase value of the actual sample is compared with the phase value of the previous sample. Consider for example binary phase shift keying (BPSK). If the phase values of both samples are identical, this corresponds to a first encoded bit value, e.g. the encoded bit value is 1. However, if both phase values differ e.g. by 180° (or ±π), this corresponds to a second encoded bit value, e.g. the encoded bit value is −1. Thus for phase modulation employing, for example, binary phase shift keying it is essential that samples of subsequent bit positions either have the same phase value or a phase value that differs by 180° (±π). Therefore, when encoding phase modulated values, a modulation is employed, such that the phase values of samples corresponding to subsequent bit positions are either equal or differ by 180° depending on the encoded bit value.

Regarding a certain watermark signature and a certain frequency band, a loudspeaker transmits a bit sequence encoded by phase modulation. All audio receivers, e.g. microphones, receive the phase modulated bit sequence. The phase difference of samples corresponding to subsequent bit positions of the received audio signals $S_1, S_2, \ldots, S_N$ should be (nearly) the same for all signals of the different microphones. If two microphones receive the same portion of the audio signal at the same time, the absolute phase values should also be identical. However, as the microphones are spaced apart (although they may only slightly be spaced apart), a first microphone may receive the same portion of the audio signal slightly earlier than a second microphone, e.g. if the first microphone is closer to the loudspeaker than the second microphone. Such a difference in time of two received time domain signals results in a difference in phase of two received frequency domain signals, e.g. time-frequency domain signals. Therefore, a phase difference of two watermarked signals received by two microphones comprises information about the position of the loudspeaker that emitted the watermarked signal relative to the location of the two microphones.

4.7 Direction Estimator 760:

The integration modules 741, 742, . . . , 74N feeds the averaged periodical blocks determined for each frequency band and each signal into the direction estimator 760 which has already received the synchronization hit position. The direction estimator 760 then performs the estimation of the direction of arrival upon the part of the incoming data pointed to by the synchronization hit position for each averaged periodical block.

In the following, we will focus on the situation that a system only comprises one loudspeaker transmitting a single watermark. However, the invention is equally applicable in case that more than one watermark is transmitted. In this case, one synchronization hit position is provided for each transmitted watermark and the averaged periodical block is then divided into different segments based on the synchronization hit position and based on the length of the watermark. The following concepts are then applied for each watermark signature and its segment of the averaged periodical block.

4.7.1 Discarding Samples at Incorrect Oversampling Positions:

In a first step, the direction estimator performs sample integration based on the averaged periodical blocks. Only the oversampling position is considered for each bit that is indicated as the correct oversampling position by the synchronization hit position. All other oversampling positions are discarded and not considered in the sample integration.

4.7.2 Inverting—1 Bits:

Then, the watermark signature is considered bit by bit starting with the first bit of the first watermark signature. The position of the corresponding sample value in the averaged periodical block is indicated by the synchronization hit position. All bits of the watermark signature and their corresponding sample values are considered. In an embodiment using BPSK as modulation scheme, a bit value of 1 is indicated by equal phase values of the actual and the previous sample, while a bit value of −1 is indicated by a phase difference of 180° of the actual and the previous sample. This is illustrated in FIG. 15c. The sequence of sample values of complex coefficients is 1510 depicted. Bit sequence 1515 indicates the encoded bits assuming that differential encoding is employed. The synchronization module now generates a processed sequence of averaged complex coefficients 1520, such that all complex coefficients roughly have the same phase value by either leaving the complex coefficient unchanged or by changing its phase value by 180°. The decision, whether a phase value of a complex coefficient is changed by 180° is determined based on evaluating the encoded bit sequence of the watermark.

For example, based on the watermark signature, an apparatus may calculate whether a bit value has been encoded by using a complex coefficient with a desired first phase value or whether a bit value has been encoded by using a complex coefficient with an undesired second phase value. If the corresponding sample value has been determined to have an undesired second phase value, the phase value of this complex coefficient is changed by 180°.

By this, while before processing, the complex coefficients of a frequency band either had a first absolute phase value or had a second absolute phase value that differed from the first phase value by about 180°, the absolute phase values of the complex coefficients for a certain frequency band of the processed sequence of averaged complex coefficients are now nearly the same for all complex coefficients regarding a certain frequency domain signal of a certain microphone.

4.7.3 Sample Integration

After adjusting the phase of samples, all complex coefficients have phase values with roughly the same value. The synchronization module 750 now conducts integration on a sample-by-sample basis. All remaining sample values (the sampling values with the correct oversampling position) which relate to a considered watermark signature are integrated, i.e. averaged, for example, added and divided by the number of added samples to obtain an averaged complex coefficient 1530.

Two effects are obtained: As a first effect a more stable absolute phase value is obtained. The different samples may be exposed to fluctuations within the channel such that the different phase values have roughly the same absolute phase values but not exactly the same phase values. As a second effect, the effect of the audio signal within the averaged sample is minimized while the effect of the watermark signature is emphasized.

Thus, an (absolute) phase value for each one of the averaged complex coefficients for the different microphones 611, 612, . . . , 61N and for each frequency band i can be determined. The phase value is an averaged phase value. As the complex coefficients are complex numbers, the absolute phase value of a complex coefficient may be determined by determining the phase value (the argument) of a complex coefficient.

Figure 15D:
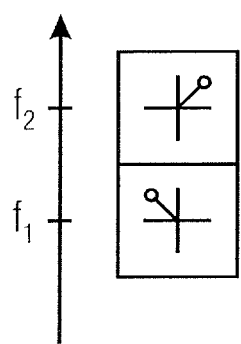
FIG. 15d illustrates two integrated complex coefficient vectors of different subbands.

However, it should be noted that the complex coefficients of different frequency bands may have different phase values as illustrated in FIG. 15d.

4.7.4 Direction Determination:

Based on the determined phase information, various types of direction information may be determined based on alternative determination concepts. By using methods that depend on the configuration of the microphone array and the use of phase differences between the incoming signals, e.g. Directional Audio Coding (DirAC) or Estimation of Signal Parameters via Rotational Invariance Techniques (ESPRIT), an estimate of the direction of arrival is obtained.

In DirAC, a sound field is analyzed by using B-format microphone signals, which comprise an omnidirectional signal w(t) and three dipole signals x(t), y(t), z(t), which correspond to the x-, y-, and z-axis of a Cartesian coordinate system.

Figure 16:
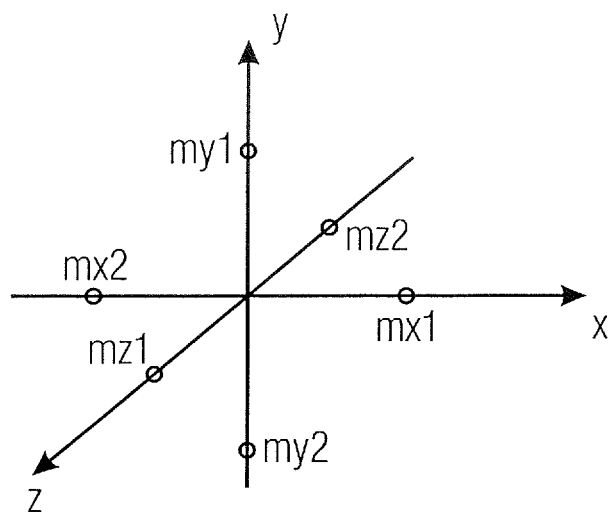
FIG. 16 illustrates six microphones arranged along the axes of a Cartesian coordinate system.

FIG. 16 illustrates a microphone arrangement of six microphones such that they form three microphone pairs. The first microphone pair mx1, mx2 is assumed to be located on an x-axis of a Cartesian coordinate system. The second microphone pair my1, my2 is arranged such that it can be assumed that it is located on a y-axis of the Cartesian coordinate system. Furthermore, the third microphone pair mz1, mz2 is arranged such that it can be assumed that it is located on a z-axis of the Cartesian coordinate system.

Consider a certain frequency band i. The determined absolute phase value regarding a considered watermark signature for a considered frequency band i is referred to as vx1 for microphone mx1, as vx2 for microphone mx2, as vy1 for microphone my1, as vy2 for microphone my2, as vz1 for microphone mz1 and as vz2 for microphone mz2. Then, the phase differences $\Delta vx$, $\Delta vy$ and $\Delta vz$ may be calculated as follows:

$$\Delta vx = vx1 - vx2;$$

$$\Delta vy = vy1 - vy2;$$

$$\Delta vz = vz1 - vz2;$$

Figure 17:
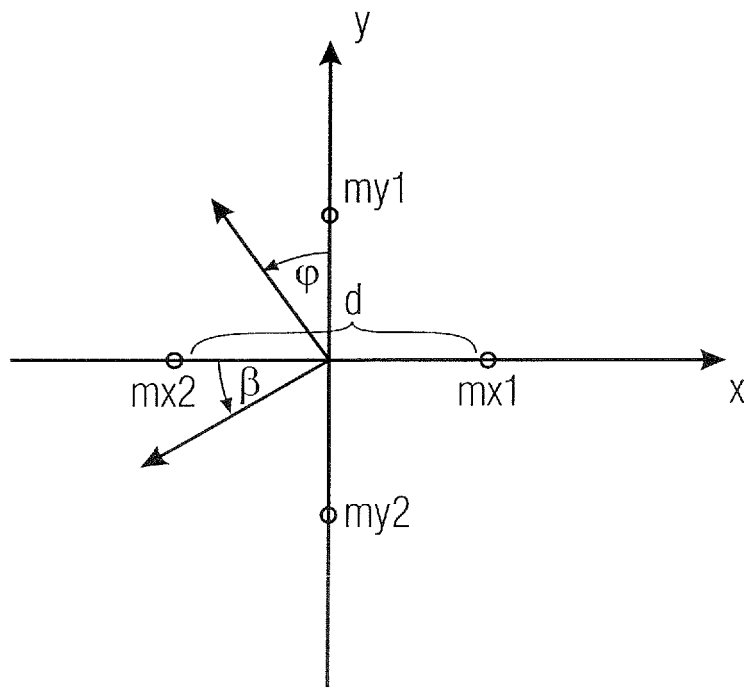
FIG. 17 shows azimuth determination in an xy-plane according to an embodiment.

Determination of an Azimuth Angle:

In an embodiment, an azimuth angle may be calculated based on the calculated phase values. Consider for example the location of microphones mx1 and mx2 in the xy-plane as illustrated in FIG. 17. The distance d between the two microphones is indicated. An angle $\varphi$ that specifies the direction of a sound source outputting the watermark signature is to be specified with respect to the xy-plane. $\varphi = 0$ corresponds to a wave hitting the microphones at the same time. I.e. the sound source is then assumed to be equally spaced apart from mx1 as from mx2. The following formula is employed:

$$\Delta vx = (-2 \cdot \pi / \lambda) \cdot d \cdot \sin(\varphi)$$

In this equation, $\lambda$ is the wavelength and is defined as $\lambda=c/fi$ wherein c is the speed of sound and wherein fi is the center frequency of the considered subband. fi may correspond to fi in the bit forming function for the considered subband as described above. d is the distance between the two microphones mx1 and mx2 and $\varphi$ is the angle indicating the direction of arrival with respect to the xy-plane to be determined.

Furthermore, $\sin(\varphi)$ is:

$$\sin(\varphi)=-\Delta vx\cdot\lambda/(2\cdot\pi\cdot d) \quad (I)$$

Thus the value $\sin(\varphi)$ can be determined.

We assume that $\varphi$ is in the range $]-\pi, \pi]$. If $\sin(\varphi)$ is $-1$ or 1, $\varphi$ can be unambiguously be determined. However, if $\sin(\varphi)$ is not $-1$ or 1, $\varphi$ can be one of two different values. For example, if $\sin(\varphi)=0$, then $\varphi$ is either 0 or $\pi$.

To resolve this ambiguity, information from further microphones may be employed. Consider the location of microphones my1 and my2 in the xy-plane as illustrated in FIG. 17. Again the distance d between the two microphones is indicated. The distance may be identical to the distance of the microphones mx1 and mx2 or may be different. An angle $\beta$ that specifies the direction of a sound source outputting the watermark signature is to be specified with respect to the xy-plane. $\beta=0$ corresponds to a wave hitting the microphones at the same time. I.e. the sound source is then assumed to be equally spaced apart from mx1 as from mx2. The following equation is employed:

$$\Delta vy=(-2\cdot\pi/\lambda)\cdot d\cdot\sin(\beta)$$

This results in the formula:

$$\sin(\beta)=-\Delta vy\cdot\lambda/(2\cdot\pi\cdot d)$$

In the embodiment illustrated in FIG. 17, $\beta=\varphi-\pi/2$. (in other embodiments, $\beta$ may be $\beta=\varphi+\pi/2$). Therefore, $$\sin(\beta)=\sin(\varphi-\pi/2)=-\cos(\varphi) \text{ and thus:}$$

$$\cos(\varphi)=\Delta vy\cdot\lambda/(2\cdot\pi\cdot d)$$

Again, if $\cos(\varphi)$ is not $-1$ or 1, $\alpha$ can be one of two values.

By calculating $\sin(\varphi)$ according to formula (I) and by calculating $\cos(\varphi)$ according to formula (II) and by determining $\varphi$ based on $\sin(\varphi)$ and $\cos(\varphi)$, the value of $\varphi$ can be unambiguously determined.

By this an angle $\varphi$ specifying a direction of arrival of a sound wave comprising a watermark signature can be determined with respect to the xy-plane and a certain frequency band i.

Determination of the angle $\varphi$ might be repeated for each one of a plurality of different frequency bands i. For each frequency band, an angle $\varphi$ is obtained that should be nearly the same for each frequency band. However, disturbances regarding certain frequency bands may influence the correctness of the determined value of angle $\varphi$ which is determined based on these frequency bands. In an embodiment, an average value of the determined values for the angle $\varphi$ is calculated. For example, the calculated angle values may be added and divided by the number of added to obtain the value of angle $\varphi$ as an average value.

Determination of the direction of arrival vector from the azimuth angle $\varphi$: The direction of arrival vector a can be computed as $$a=(\cos(\varphi), \sin(\varphi)).$$

Alternative Determination of a Direction of Arrival Vector:

In an embodiment, a direction of arrival vector is determined based on the calculated phase values as follows.

Returning to FIG. 17, as explained above, the phase differences $\Delta vx$, $\Delta vy$ and $\Delta vz$ for the absolute phase values may be calculated by applying $\Delta vx=vx1-vx2$; $\Delta vy=vy1-vy2$; and $\Delta vz=vz1-vz2$.

In an embodiment, it is assumed that the distance dx between the microphone mx1 and mx2, the distance dy between the microphone my1 and my2 and the distance dz between the microphone mz1 and mz2 are equal.

Then $\Delta vx$, $\Delta vy$ and $\Delta vz$ form the components of the direction of arrival vector a, when $\Delta vx$, $\Delta vy$ and $\Delta vz$ are expressed in the range$]-\pi; \pi]$:

$$a=(\Delta vx,\Delta vy,\Delta vz)$$

which points to the direction of the sound source.

In a further embodiment, the distance dx between the microphone mx1 and mx2, the distance dy between the microphone my1 and my2 and the distance dz between the microphone mz1 and mz2 are not equal. In such an embodiment, the modified phase differences have to be adjusted to take the different distances into account, e.g. by applying a correction factor. For example, the components ax, ay and az may be determined according to:

$$ax=(1/dx)\cdot\Delta vx; ay=(1/dy)\cdot\Delta vy; az=(1/dz)\cdot\Delta vz$$

such that the direction of arrival vector results to a=(ax, ay, az).

In further embodiments, the vector a may be normalized, e.g. by multiplying its components by a factor k, e.g., $$k=1/\sqrt{\Delta vx^2+\Delta vy^2+\Delta vz^2}$$

The direction of arrival vector is explained with reference to FIG. 18a-18d. For a better illustration, the situation in a two-dimensional xy-plane is explained. It is assumed that the distance dx between the microphone mx1 and mx2 and the distance dy between the microphones my1 and my2 are equal. However, the explanations given also apply to the three-dimensional case and to situations where the microphone distances are not equal, but where the phase differences $\Delta vx$ and $\Delta vy$ have been adjusted, e.g. by applying a distance factor.

Consider a direction of arrival vector a=($\Delta vx$, $\Delta vy$, $\Delta vz$). Its components $\Delta vx$, $\Delta vy$, $\Delta vz$ are the phase differences as obtained by the above described embodiments. For the purpose of illustration, we only consider the x- and y-components of a vector a'=($\Delta vx$, $\Delta vy$).

Figure 18A:
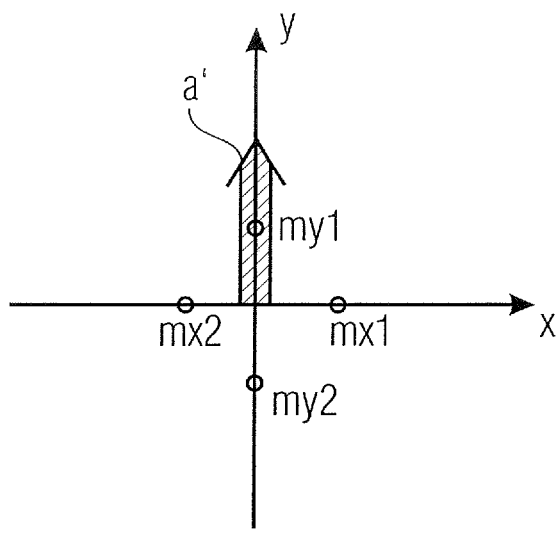
FIG. 18a-d depicts direction of arrival vectors determined according to an embodiment.

In FIG. 18a, we consider a two-component direction of arrival vector a'=(0, 1).

The x-component of the vector $\Delta vx$ is 0, i.e. no phase difference exists with respect to the absolute phase values of the signals received by both microphones mx1 and mx2. Thus, the corresponding audio wave is hitting both microphones mx1 and mx2 at the same time, and it is assumed that the sound source is equally spaced apart from both microphones mx1 and mx2. As a result the direction of arrival vector a' is neither negative nor positive.

The y-component of the vector $\Delta vy$ is 1. As $\Delta vy=vy1-vy2$ this indicates that the absolute phase value vy1 is greater than the absolute phase value vy2, and thus that the respective audio wave arrived earlier at microphone my1 than at microphone my2. Thus the direction of arrival vector points a' to the positive direction of the y-axis.

Figure 18B:
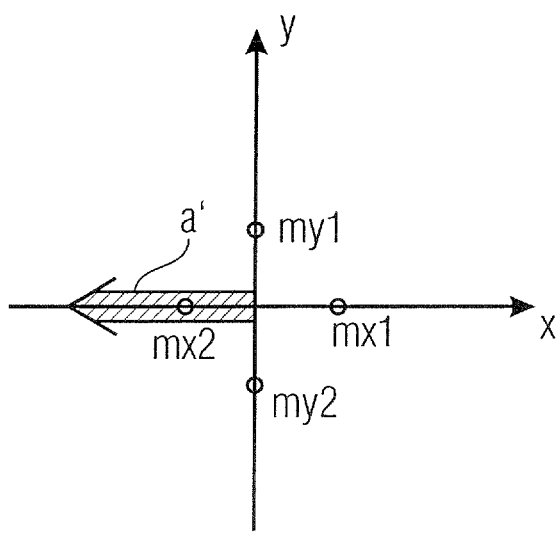

In FIG. 18b, a two-component direction of arrival vector a'=(-1, 0) is considered.

The y-component of the vector $\Delta vy$ is 0, i.e. no phase difference exists regarding the absolute phase values of the signals received by both microphones my1 and my2. Thus, the corresponding audio wave is hitting both microphones my1 and my2 at the same time, and it is assumed that the sound source is equally spaced apart from both microphones my1 and my2. As a result the direction of arrival vector a' is neither negative nor positive.

The x-component of the vector Δvx is −1. As Δvx=vx1−vx2 this indicates that the absolute phase value vx2 is greater than the absolute phase value vx1, and thus that the respective audio wave arrived earlier at microphone mx2 than at microphone mx1. Thus the direction of arrival vector a' points to the negative direction of the y-axis.

Figure 18C:
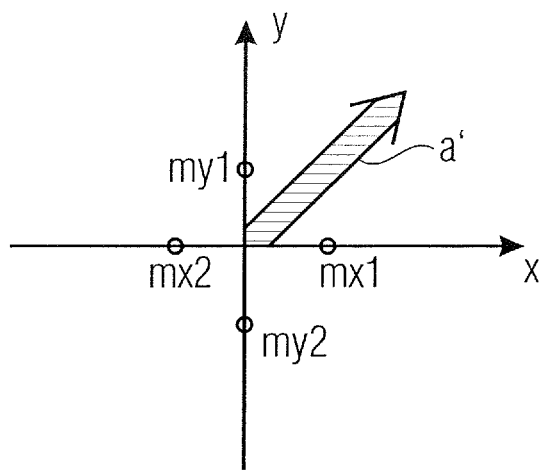

In FIG. 18c, we consider a two-component direction of arrival vector a'=(1, 1).

The x-component of the vector Δvx is 1. As Δvx=vx1−vx2 this indicates that the absolute phase value vx1 is greater than the absolute phase value vx2, and thus that the respective audio wave arrived earlier at microphone mx1 than at microphone mx2. Thus, the direction of arrival vector a' points to the positive direction of the x-axis.

The y-component of the vector Δvy is 1. As Δvy=vy1−vy2, this indicates that the absolute phase value vy1 is greater than the absolute phase value vy2, and thus that the respective audio wave arrived earlier at microphone my1 than at microphone my2. Thus the direction of arrival vector a' points to the positive direction of the y-axis.

As the phase differences Δvx and Δvy are equal, and as it can be assumed that a corresponding audio wave propagates equally fast in x-direction as in y-direction, the x-component and the y-component of the direction of arrival vector have equal values.

Figure 18D:
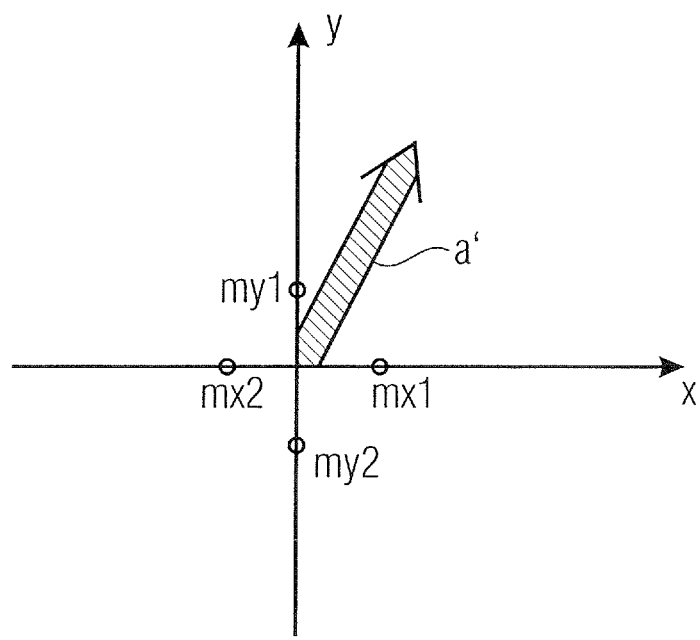

In FIG. 18d, a two-component direction of arrival vector a'=(2, 1) is considered.

The y-component of the vector Δvx is 2. As Δvx=vx1−vx2, this indicates that the absolute phase value vx1 is greater than the absolute phase value vx2, and thus that the respective audio wave arrived earlier at microphone mx1 than at microphone mx2. Thus, the direction of arrival vector a' points to the positive direction of the x-axis.

The y-component of the vector Δvy is 1. As Δvy=vy1−vy2 this indicates that the absolute phase value vy1 is greater than the absolute phase value vy2, and thus that the respective audio wave arrived earlier at microphone my1 than at microphone my2. Thus the direction of arrival vector a' points to the positive direction of the y-axis.

As the phase differences Δvx and Δvy are equal and as we can assume that a corresponding audio wave propagates faster, in x-direction than in y-direction and that its velocity in x-direction is two times of the velocity in y-direction, the x-component is twice the size of the y-component of the direction of arrival vector.

Direction of Arrival Vector Determination Based on Multiple Frequency Bands:

As has explained above, the direction of arrival vector is determined based on phase values of a certain frequency band. In an embodiment, the direction of arrival vector is calculated for a plurality of frequency bands to obtain a plurality of direction of arrival vectors. The plurality of frequency band vectors may then be normalized e.g. by multiplying their components by vector-specific normalization factors to obtain normalized direction of arrival vectors. E.g. for each frequency band, a vector-specific normalization factor n may be determined, for example according to the formula:

$$n = \frac{1}{f_i},$$

where $f_i$ is the center frequency of the i-th subband.

Then, an average direction of arrival vector may be determined. Averaging may, for example, be achieved by adding the plurality of direction of arrival vectors and by dividing the components of the obtained vector by the number of normalized direction of arrival vectors that are averaged.

In a embodiment, azimuth and elevation angles may be calculated based on the determined direction of arrival vector using the methods employed in the context of Directional Audio Coding (DirAC).

Alternative estimation of the direction of arrival vector using complex receiver-specific information:

In a further embodiment, the complex values regarding a considered watermark signature for a considered frequency band i can be used to estimate the direction of arrival using the Directional Audio Coding (DirAC) technique.

Let Δpx, denote the difference between the complex values obtained from microphones mx1 and mx2 from FIG. 16. Analogously, Δpy and Δpz are obtained for the y and z axes. Let further p0 be the average of the complex values obtained at all microphones.

The direction of arrival vector a is computed from the active intensity vector Ia=(Iax, Iay, Iaz) defined as $$Iax = 0.5\ \text{Real}(p0 \cdot \text{conj}(\Delta px))$$

$$Iay = 0.5\ \text{Real}(p0 \cdot \text{conj}(\Delta py))$$

$$Iaz = 0.5\ \text{Real}(p0 \cdot \text{conj}(\Delta pz)),$$

where Real( ) extracts the real part, and conj denotes complex conjugation, and where 0.5 designates 0.5.

The direction of arrival vector is $$a = -Ia/\text{norm}(Ia),$$

where norm( ) computes the L2 norm of the argument. Azimuth and elevation angles are readily computed with $$\text{azimuth} = a\ \tan(Iay/Iax)$$

$$\text{elevation} = a\ \tan(\text{norm}(Ia), \text{sqrt}(Iax^2 + Iay^2)),$$

where sqrt is the square root, where Iax^2 designates $Iax^2$, and where Iay^2 designates $Iay^2$.

Position Estimation of the Recording Unit

Figure 19:
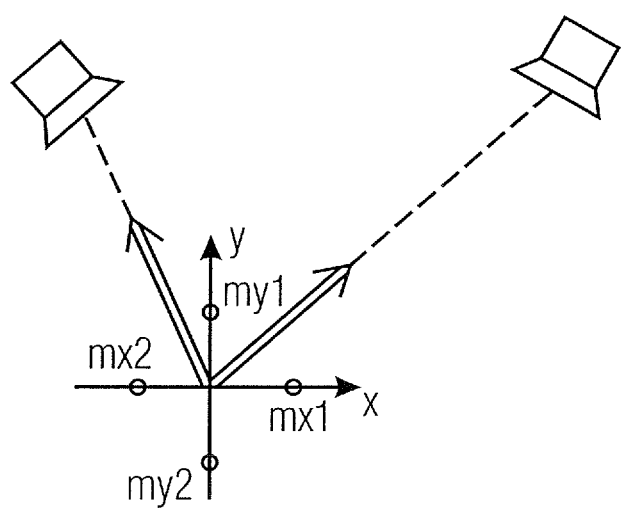
FIG. 19 illustrates position estimation according to an embodiment.

FIG. 19 illustrates position estimation in a two-dimensional scenario. There, we assume, that the position of loudspeakers is known. We further assume that the loudspeakers and the array of recording microphones are located in the same plane.

A direction of arrival vector is determined for each one of the loudspeakers according to one of the above-described embodiments. The direction of arrival vector of the first loudspeaker points to the first loudspeaker. The direction of arrival vector of the second loudspeaker points to the second loudspeaker.

Basically, a direction of arrival vector points to the direction of arrival of a sound wave from a loudspeaker, wherein the components of the vector may be expressed with reference to a Cartesian coordinate system. In embodiments, however, the axes of the coordinate system are defined by the location of the microphones: The location of mx1 and mx2 defines the x-axis, and the location of my1 and my2 defines the y-axis of the coordinate system the direction of arrival vector refers to.

If the orientation of the microphone array is known, and if the (absolute) positions of the two loudspeakers are known, two direction of arrival vectors are enough in the two-dimensional case to define the position of the microphone array This is illustrated in FIG. 19.

In such an embodiment, an apparatus for position estimation is adapted to calculate a direction of arrival vector for each loudspeaker outputting sound waves comprising watermark signatures. A first line in the two-dimensional plane is calculated that is parallel to the direction of arrival vector of the first loudspeaker and that intersects the position of the first loudspeaker. Moreover, a second line in the two-dimensional plane is calculated that is parallel to the direction of arrival vector of the second loudspeaker and that intersects the position of the second loudspeaker. Then, the intersection point of the first and second line in the two dimensional plane is calculated, wherein the intersection point determines the position of the microphone array.

In further embodiments, the described concept is applied in environments, wherein microphone array and the loudspeakers are not located in a two dimensional plane, applying three-dimensional direction of arrival vectors (direction of arrival vectors with three components). There, it is assumed that the location of the loudspeakers is known. An apparatus calculates the lines parallel to the determined direction of arrival vectors, wherein the calculated lines intersect the loudspeaker position of the loudspeaker of their direction of arrival vector. The point, where all calculated lines intersect each other is the determined position of the microphone array.

Figure 20A:
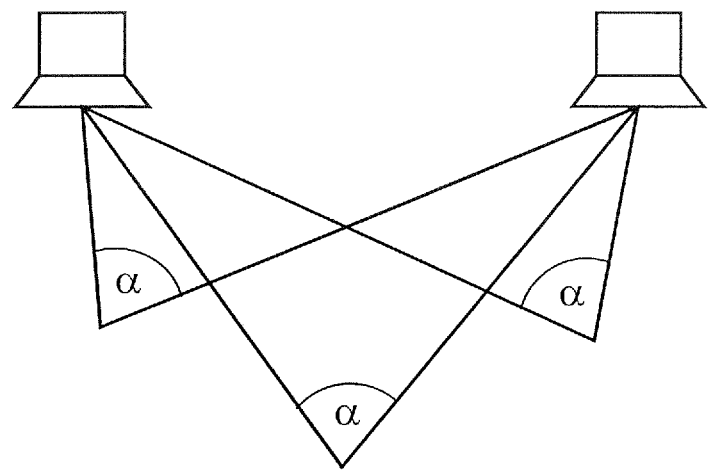
FIG. 20a-b depicts position estimation challenges and solutions.

For the illustrative purposes, let us return to the two-dimensional case. If the orientation of the microphone array is not known, then two direction of arrival vectors of two loudspeakers are then not enough to determine the position of the microphone array. In such a scenario, an angle α between the first and the second direction of arrival vector could be calculated, but as the orientation of the microphone array and thus the orientation of the coordinate system defined by the microphone array would not be known, the position of the microphone array could not unambiguously defined, even if the position of the loudspeaker (e.g. expressed referring to a second coordinate system) was known. This is illustrated in FIG. 20a.

However, by employing a third loudspeaker outputting a third audio wave comprising a watermark signature, the ambiguity could be resolved. This is explained with reference to FIG. 20b. If the directions of arrival of at least three loudspeakers (M≥3) are estimated, the spatial position of the microphone array can also be determined FIG. 21 illustrates a corresponding position estimator. When using three loudspeakers, it is assumed that the loudspeakers and the recording unit are in a common plane. However, the spatial positions the loudspeakers have to be known at the receiver. Relying on this information, it is possible to obtain the recording position by solving a system of nonlinear equations in the position estimator 800.

Figure 20B:
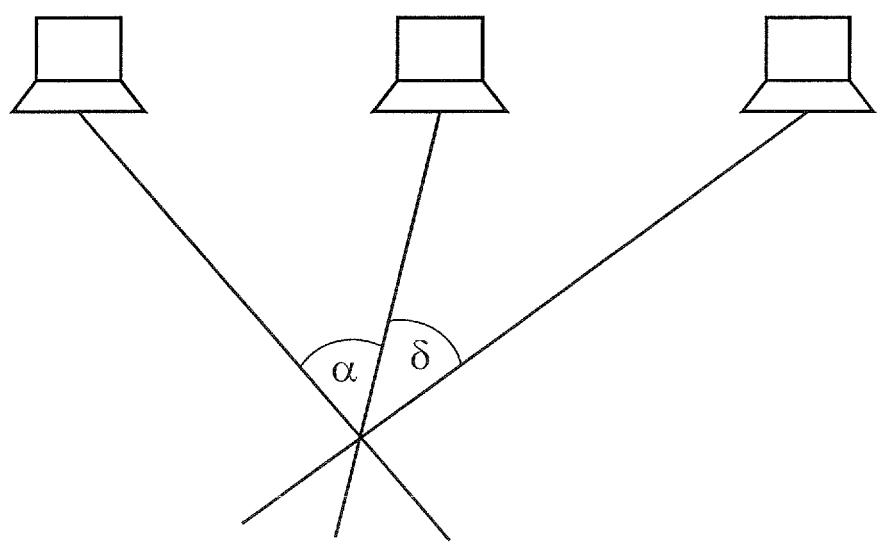
Figure 21:
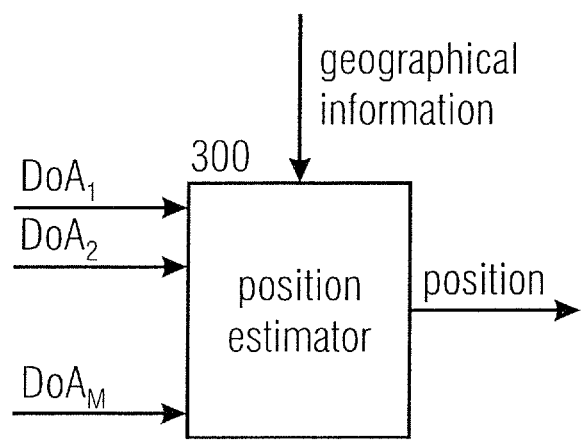
FIG. 21 illustrates an apparatus for position estimation according to an embodiment.

In the embodiment of FIG. 20b, an apparatus for position estimation calculates the first direction of arrival vector of the first loudspeaker, the second direction of arrival vector of the second loudspeaker and the third direction of arrival vector of the third loudspeaker. Then, a first angle α between the first and second direction of arrival vector and a second angle δ between the second and third direction of arrival vector may be calculated. The apparatus for decision estimation then determines the point in the two-dimensional plane such that three lines each of which intersecting a loudspeaker position and the determined point have the determined angle relations with respect to each other. I.e. the first line intersecting the first loudspeaker position and the second line intersecting the second loudspeaker position intersect each other in the determined point such that their intersection angle is equal to the first angle. The second line intersecting the second loudspeaker position and the third line intersecting the third loudspeaker position intersect each other in the determined point such that their intersection angle is equal to the second angle. The determined point is the position of the microphone array.

In further embodiments, a position estimator determines the position of a microphone array whose orientation is not known for the three-dimensional case, i.e. for a configuration where the loudspeakers and the microphone array are not all located in a two-dimensional plane. Determination is achieved based on the above-described concept by employing three-dimensional direction of arrival vectors, i.e. direction of arrival vectors having three components.

Figure 22:
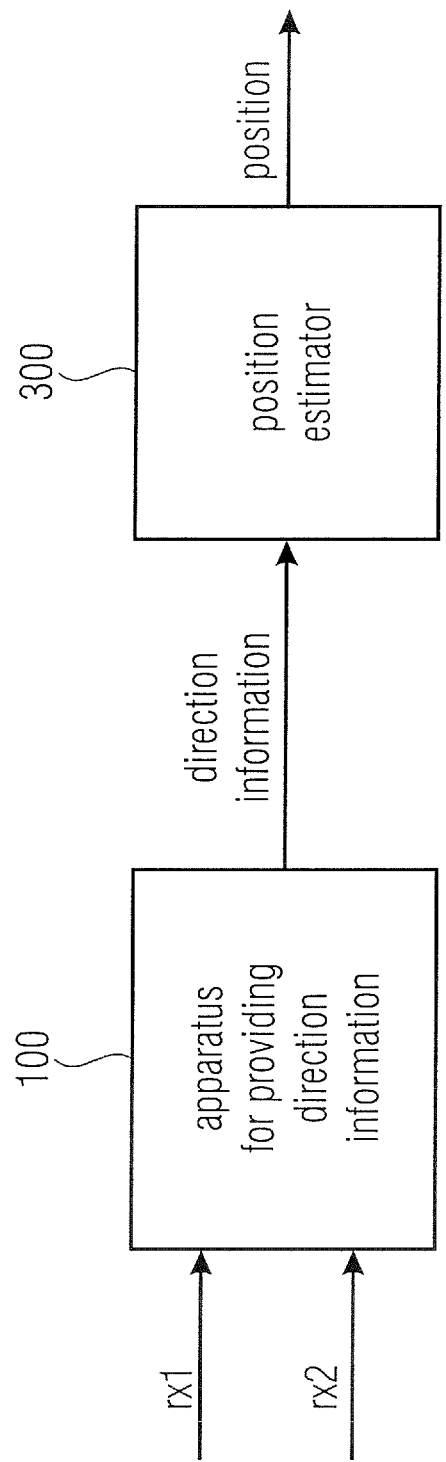
FIG. 22 illustrates an apparatus for spatial position estimating according to an embodiment.

FIG. 22 illustrates an apparatus for spatial position estimating according to an embodiment. The apparatus for spatial position estimating comprises an apparatus 100 for providing direction information according to one of the above-described embodiments, which processes received watermarked audio signals rx1, rx2. Furthermore, the apparatus for spatial position estimating comprises a position estimator 300 for estimating a position of the apparatus for spatial position estimating. The position estimator is adapted to estimate the position of the apparatus for spatial position estimating based on the direction information provided by the apparatus for providing direction information.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive decomposed signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for providing direction information based on a reproduced audio signal with an embedded watermark, comprising:
   a signal processor being adapted to process at least two recorded watermarked audio signals recorded by at least two audio receivers at different spatial positions, wherein the audio receivers are adapted to record sound waves of the reproduced audio signal to acquire the recorded watermarked audio signals, each recorded watermarked audio signal being an audio signal which comprises the embedded watermark, wherein the signal processor is adapted to process the recorded watermarked audio signals to calculate phase information for each recorded watermarked audio signal of the at least two recorded watermarked audio signals, and
   a direction information provider,
   wherein at least one of the signal processor and the direction information provider is implemented using a hardware apparatus or a computer or a combination of a hardware apparatus and a computer,
   wherein the phase information for each recorded watermarked audio signal of the at least two recorded watermarked audio signals is calculated by processing bits of different subbands of the embedded watermark embedded in said recorded watermarked audio signal, and
   wherein the direction information provider calculates the direction information using the phase information determined depending on the embedded watermark in each recorded watermarked audio signal.

2. The apparatus according to claim 1, wherein the signal processor comprises an analysis module for transforming the recorded watermarked audio signals from a time domain into a time-frequency domain to acquire a time-frequency domain transmission signal comprising a plurality of subband signals.

3. The apparatus according to claim 1, wherein the signal processor is adapted to determine a complex number as the phase information.

4. The apparatus according to claim 1, wherein the signal processor is adapted to determine an averaged phase value as the phase information based on a determined averaged complex coefficient.

5. The apparatus according to claim 4, wherein the signal processor is adapted to generate the averaged complex coefficient by determining an averaged periodical block comprising processed complex coefficients of a subband signal.

6. The apparatus according to claim 2, wherein the signal processor is adapted to determine an averaged phase value as the phase information based on a determined averaged complex coefficient, and wherein the signal processor is adapted to generate the averaged complex coefficient by determining an averaged periodical block comprising processed complex coefficients of one of the plurality of subband signals.

7. The apparatus according to claim 5, wherein the signal processor is adapted to determine the averaged complex coefficient by combining at least two of the processed complex coefficients of the subband signals, wherein the processed complex coefficients comprise equal phase values or phase values that differ by no more than 0.5 in radian measure.

8. The apparatus according to claim 5, wherein the signal processor is adapted to generate the processed complex coefficients by changing the phase value of at least one of the complex coefficients by a predetermined number.

9. The apparatus according to claim 1, wherein the signal processor is adapted to determine a synchronization hit position that indicates a position of a complex coefficient encoding a first bit of a watermark signature.

10. The apparatus according to claim 5, wherein the signal processor is adapted to determine a synchronization hit position that indicates a position of at least one of the processed complex coefficients encoding a first bit of a watermark signature of the embedded watermark embedded in the recorded watermarked audio signals.

11. The apparatus according claim 1, wherein the direction information provider is adapted to employ a complex number for determining and providing direction information.

12. The apparatus according claim 1, wherein the direction information provider is adapted to provide a direction of arrival vector as direction information.

13. The apparatus for providing direction information according to claim 1, further comprising: a position estimator for estimating a position of the apparatus for spatial position estimating, wherein the position estimator is adapted to estimate the position of the apparatus for spatial position estimating based on the direction information provided by the apparatus for providing direction information.

14. A method executed by a hardware processor or computing apparatus for providing direction information, comprising:
   receiving watermarked audio signals, each recorded watermarked audio signal being an audio signal which comprises an embedded watermark,
   processing at least two recorded watermarked audio signals recorded by at least two audio receivers at different spatial positions to calculate phase information for each recorded watermarked audio signal of the at least two recorded watermarked audio signals wherein the phase information for each recorded watermarked audio signal of the at least two recorded watermarked audio signals is calculated by processing bits of different subbands of the embedded watermark embedded in said recorded watermarked audio signal, wherein the direction information is calculated using the phase information determined on the embedded watermark in each recorded watermarked audio signal.

15. The method according to claim 14, wherein receiving the watermarked audio signals is conducted by employing an array of at least two audio receivers, each recorded watermarked audio signal comprising an embedded watermark, and wherein the method further comprises estimating a position of the array of at the at least two audio receivers, wherein the position is determined based on the direction information.

16. A non-transitory computer-readable medium comprising a computer program for performing a method for spatial position estimating, when the computer program is executed by a computer or processor, wherein the method comprises:

receiving watermarked audio signals, each recorded watermarked audio signal being an audio signal which comprises the embedded watermark, processing at least two recorded watermarked audio signals recorded by at least two audio receivers at different spatial positions to calculate phase information for each recorded watermarked audio signal of the at least two recorded watermarked audio signals, and wherein receiving the watermarked audio signals is conducted by employing an array of at least two audio receivers, each recorded watermarked audio signal comprising an embedded watermark, and wherein the method further comprises estimating a position of the array of at the at least two audio receivers, wherein the position is determined based on direction information wherein the phase information for each recorded watermarked audio signal of the at least two recorded watermarked audio signals is calculated by processing bits of different subbands of the embedded watermark embedded in said recorded watermarked audio signal, wherein the direction information is calculated using the phase information determined depending on the embedded watermark in each recorded watermarked audio signal.

\* \* \* \* \*